US010833827B2

(12) United States Patent
Baghel et al.

(10) Patent No.: US 10,833,827 B2
(45) Date of Patent: Nov. 10, 2020

(54) V2X CONTROL AND DATA CHANNEL INDICATION DURING LBT

(71) Applicant: QUALCOMM Incorporated, San Diego, CA (US)

(72) Inventors: Sudhir Kumar Baghel, Hillsborough, NJ (US); Tao Luo, San Diego, CA (US); Shailesh Patil, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 13 days.

(21) Appl. No.: 16/273,048

(22) Filed: Feb. 11, 2019

(65) Prior Publication Data

US 2019/0273592 A1   Sep. 5, 2019

Related U.S. Application Data

(60) Provisional application No. 62/638,869, filed on Mar. 5, 2018.

(51) Int. Cl.
  *H04J 11/00* (2006.01)
  *H04L 5/00* (2006.01)
  *H04W 4/40* (2018.01)
  *H04L 1/00* (2006.01)
  *H04L 1/08* (2006.01)
  *H04W 72/04* (2009.01)

(52) U.S. Cl.
  CPC .......... *H04L 5/0048* (2013.01); *H04L 1/0079* (2013.01); *H04L 1/08* (2013.01); *H04L 5/001* (2013.01); *H04L 5/0039* (2013.01); *H04W 4/40* (2018.02); *H04W 72/0406* (2013.01)

(58) Field of Classification Search
  CPC ... H04L 1/0056; H04L 5/0048; H04L 5/0039; H04L 1/08; H03M 13/09; H03M 13/13; H03M 13/45; H04W 4/40; H04W 72/044
  See application file for complete search history.

(56) References Cited

U.S. PATENT DOCUMENTS

| 10,284,655 | B2 * | 5/2019 | Weisman | ................. H04L 67/12 |
| 10,601,558 | B2 * | 3/2020 | Li | ........................... H04B 1/713 |
| 10,624,112 | B2 * | 4/2020 | Patil | ...................... H04W 76/14 |

(Continued)

OTHER PUBLICATIONS

Catt: "Discussion on Contents of Scheduling Assignment", 3GPP Draft, R1-166434, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22, 2016-Aug. 26, 2016, Aug. 21, 2016 (Aug. 21, 2016), XP051140231, Retrieved from the Internet:URL:http://www.3gpp.org/ftp/Meetings_3GPP_SYNC/RAN1/Docs/ [retrieved on Aug. 21, 2016], p. 2, Time Domain Resource Indication.

(Continued)

*Primary Examiner* — Hanh N Nguyen
(74) *Attorney, Agent, or Firm* — Loza & Loza LLP

(57) ABSTRACT

Aspects of the disclosure relate to mechanisms for encoding and transmitting an encoded channel indication that indicates a starting sub-channel and a number of sub-channels for a transmission over a vehicle-to-everything (V2X) carrier. The encoded channel indicator may be transmitted within at least one symbol of a listen-before-talk (LBT) section of a slot.

27 Claims, 22 Drawing Sheets

(56) References Cited

U.S. PATENT DOCUMENTS

2009/0259909 A1    10/2009  Luo
2016/0249350 A1\*   8/2016  Koutsimanis ........... H04L 5/008
2017/0289971 A1\*  10/2017  Wu ....................... H04L 5/0053
2018/0160452 A1\*   6/2018  Patil .................. H04W 72/0446

OTHER PUBLICATIONS

International Search Report and Written Opinion—PCT/US2019/017673—ISA/EPO—dated May 6, 2019.

\* cited by examiner

V2X CONTROL AND DATA CHANNEL INDICATION DURING LBT

PRIORITY CLAIM

This application claims priority to and the benefit of Provisional Patent Application No. 62/638,869, entitled "NRV2X Control and Data Channel Indication During LBT," filed in the U.S. Patent and Trademark Office on Mar. 5, 2018, the entire contents of which are incorporated herein by reference as if fully set forth below in their entirety and for all applicable purposes.

TECHNICAL FIELD

The technology discussed below relates generally to wireless communication networks, and more particularly, to Vehicle-to-Everything (V2X) wireless communication.

INTRODUCTION

Vehicle-to-Everything (V2X) communication involves the exchange of information not only between vehicles themselves, but also between vehicles and external systems, such as streetlights, buildings, pedestrians, and wireless communication networks. V2X systems enable vehicles to obtain information related to the weather, nearby accidents, road conditions, activities of nearby vehicles and pedestrians, objects nearby the vehicle, and other pertinent information that may be utilized to improve the vehicle driving experience, increase vehicle safety, and support autonomous vehicles.

As the demand for V2X communication increases, research and development continue to advance V2X technologies not only to meet the growing demand for V2X, but also to advance and enhance the vehicle driving experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure relate to mechanisms for encoding a resource indication that indicates a starting sub-channel and a number of sub-channels for a transmission over a vehicle-to-everything (V2X) carrier to produce an encoded channel indicator. A transmitting wireless communication device may transmit an encoded channel indicator within at least one symbol of a listen-before-talk (LBT) section of a slot. For example, the transmitting wireless communication device may transmit the encoded channel indicator over the number of sub-channels within one symbol of the LBT section of the slot, and then repeat the encoded channel indicator over the number sub-channels within each subsequent symbol of the LBT section of the slot.

Once decoded, a receiving wireless communication device may utilize the resource indication to identify the starting sub-channel and the number of sub-channels that a transmitting wireless communication device utilizes to transmit control information and/or data. In some examples, the transmitting wireless communication device may transmit the control information within a physical sidelink control channel, and may transmit the data within a physical sidelink shared channel.

In some examples, the resource indication may include a resource indicator value (RIV) calculated from the starting sub-channel and the set of contiguous sub-channels. The encoder may further interleave the information bits of the RIV with a demodulation reference signal (DMRS) to produce an interleaved channel indicator and polar encode the interleaved channel indicator to produce the encoded channel indicator. In some examples, the transmitting wireless communication device may transmit the encoded channel indicator in the form of repeated half-symbols.

In one aspect, the disclosure provides a method for wireless communication over a vehicle-to-everything (V2X) carrier that includes spectrum that is time-divided into a plurality of slots and frequency-divided into a plurality of sub-channels. The method includes selecting resources including a starting sub-channel and a set of contiguous sub-channels of the plurality of sub-channels for a transmission, where each of the sub-channels includes a set of contiguous subcarriers. The method further includes encoding a resource indication indicating the starting sub-channel and the set of contiguous sub-channels for the transmission to produce an encoded channel indicator, transmitting the encoded channel indicator over the set of contiguous sub-channels within at least one symbol of a listen-before-talk (LBT) section of a slot of the plurality of slots, and transmitting information corresponding to the transmission within a transmit section of the slot.

In another aspect, the disclosure provides a vehicle-to-everything (V2X) device that includes a processor, a memory communicatively coupled to the processor, and a wireless transceiver communicatively coupled to the processor and configured to communicate over a V2X carrier including spectrum that is time-divided into a plurality of slots and frequency-divided into a plurality of sub-channels. The processor is configured to select resources including a starting sub-channel and a set of contiguous sub-channels of the plurality of sub-channels for a transmission, where each of the sub-channels includes a set of contiguous subcarriers. The processor is further configured to encode a resource indication indicating the starting sub-channel and the set of contiguous sub-channels for the transmission to produce an encoded channel indicator, transmit the encoded channel indicator over the set of contiguous sub-channels within at least one symbol of a listen-before-talk (LBT) section of a slot of the plurality of slots, and transmit information corresponding to the transmission within a transmit section of the slot.

In another aspect, the disclosure provides a method for wireless communication over a vehicle-to-everything (V2X) carrier including spectrum that is time-divided into a plurality of slots and frequency-divided into a plurality of sub-channels, where each of the sub-channels includes a set of contiguous subcarriers. The method includes receiving an encoded channel indicator within at least one symbol of a listen-before-talk (LBT) section of a slot of the plurality of slots, decoding the encoded channel indicator to identify a starting sub-channel and a set of contiguous sub-channels of the plurality of sub-channels for receiving a transmission over the V2X carrier, and receiving information corresponding to the transmission over the set of contiguous sub-channels within a transmit section of the slot.

In another aspect, the disclosure provides a vehicle-to-everything (V2X) device that includes a processor, a memory communicatively coupled to the processor, and a wireless transceiver communicatively coupled to the processor and configured to communicate over a V2X carrier including spectrum that is time-divided into a plurality of slots and frequency-divided into a plurality of sub-channels, where each of the sub-channels includes a set of contiguous subcarriers. The processor is configured to receive an encoded channel indicator within at least one symbol of a listen-before-talk (LBT) section of a slot of the plurality of slots, decode the encoded channel indicator to identify a starting sub-channel and a set of contiguous sub-channels of the plurality of sub-channels for receiving a transmission over the V2X carrier, and receive information corresponding to the transmission over the set of contiguous sub-channels within a transmit section of the slot.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
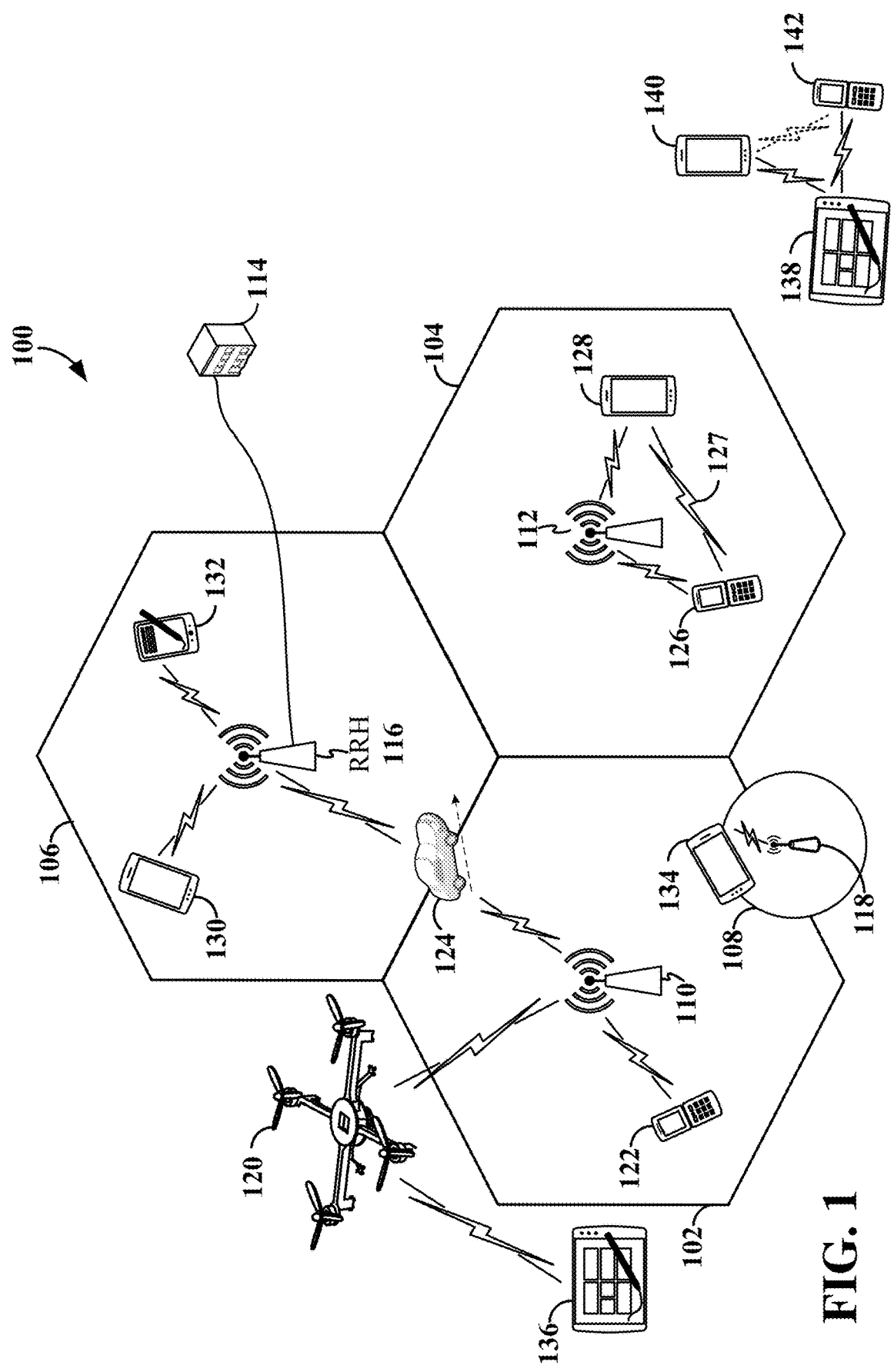
FIG. 1 is a diagram illustrating an example of a wireless radio access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the present disclosure, two or more UE (e.g., UEs 126 and 128) may communicate with each other using peer to peer (P2P) or sidelink signals 127 without relaying that communication through a base station (e.g., base station 112).

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe/slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the RAN 100 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard.

Figure 2:
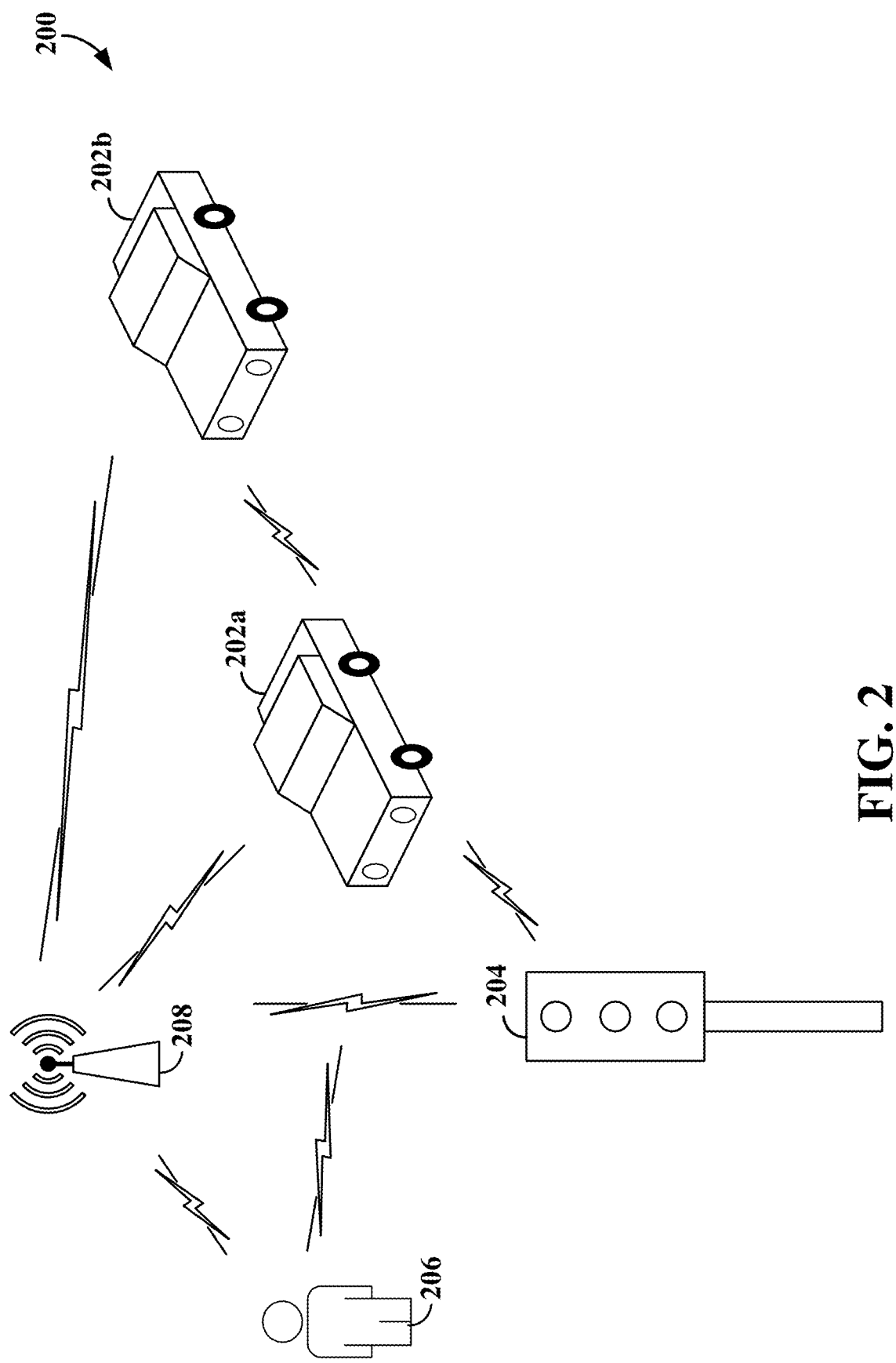
FIG. 2 is a diagram illustrating an example of a vehicle-to-everything (V2X) wireless communication network.

FIG. 2 illustrates an example of a vehicle-to-everything (V2X) wireless communication network 200. A V2X network can connect vehicles 202a and 202b to each other (vehicle-to-vehicle (V2V)), to roadway infrastructure 204 (vehicle-to-infrastructure (V2I)), to pedestrians/cyclists 206 (vehicle-to-pedestrian (V2P)), and/or to the network 208 (vehicle-to-network (V2N)).

A V2I transmission may be between a vehicle (e.g., vehicle 202a) and a roadside unit (RSU) 204, which may be coupled to various infrastructure, such as a traffic light, building, streetlight, traffic camera, tollbooth, or other stationary object. The RSU 204 may act as a base station enabling communication between vehicles 202a and 202b, between vehicles 202a/202b and the RSU 204 and between vehicles 202a/202b and mobile devices 206 of pedestrians/cyclists. The RSU 204 may further exchange V2X data gathered from the surrounding environment, such as a connected traffic camera or traffic light controller, V2X connected vehicles 202a/202b, and mobile devices 206 of pedestrians/cyclists, with other RSUs 204 and distribute that V2X data to V2X connected vehicles 202a/202b and pedestrians 206. Examples of V2X data may include status information (e.g., position, speed, acceleration, trajectory, etc.) or event information (e.g., traffic jam, icy road, fog, pedestrian crossing the road, collision, etc.), and may also include video data captured by a camera on a vehicle or coupled to an RSU 204.

Such V2X data may enable autonomous driving and improve road safety and traffic efficiency. For example, the exchanged V2X data may be utilized by a V2X connected vehicle 202a/202b to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device 206 of a pedestrian/cyclist may be utilized to trigger a warning sound, vibration, flashing light, etc., in case of imminent danger.

V2N communication may utilize traditional cellular links to provide cloud services to a V2X device (e.g., a vehicle 202a/202b, RSU 204, or pedestrian 206) for latency-tolerant use cases. For example, V2N may enable a V2X network server to broadcast messages (e.g., weather, traffic, or other information) to V2X devices over a wide area network and may enable V2X devices to send unicast messages to the V2X network server. In addition, V2N communication may provide backhaul services for RSUs 204.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
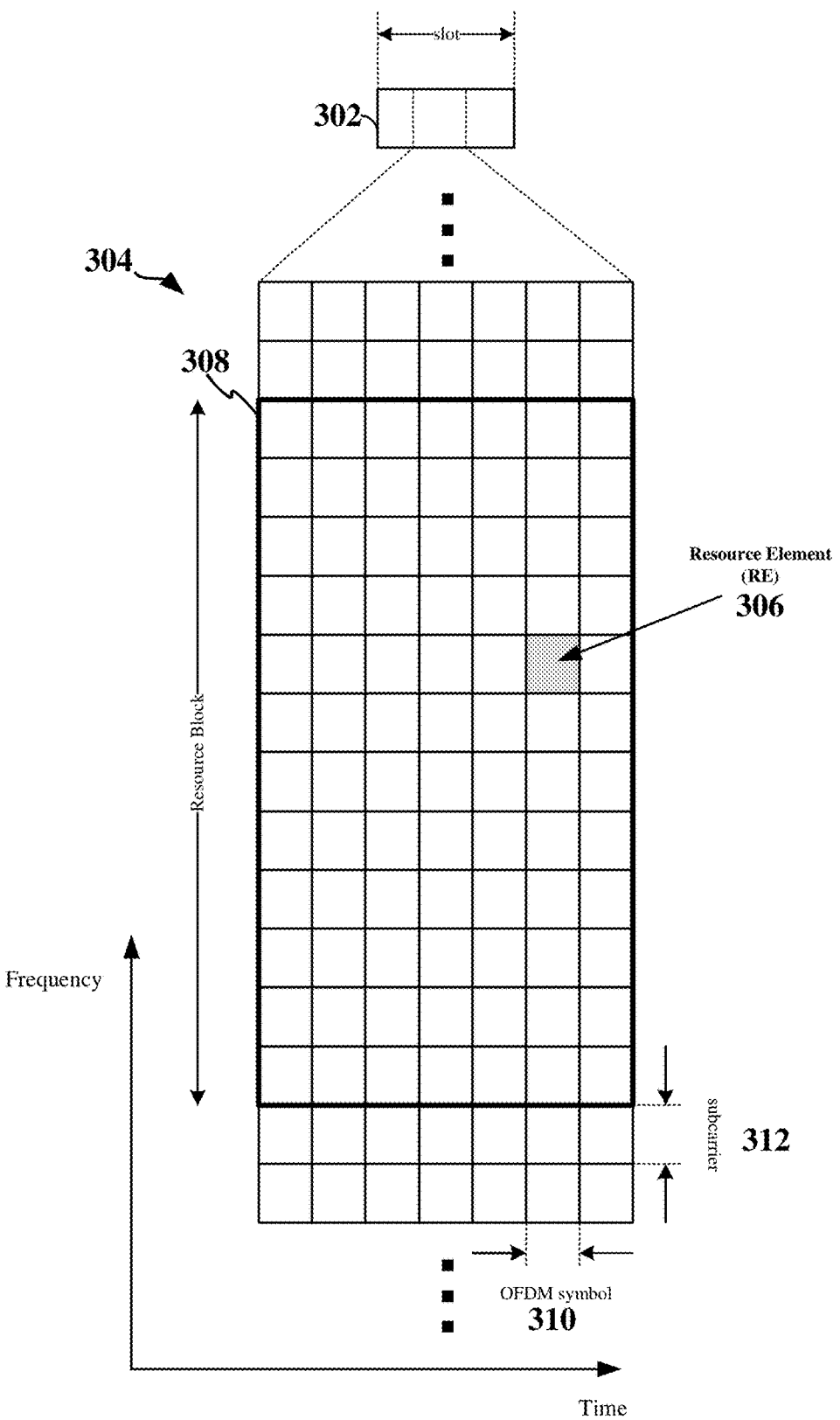
FIG. 3 is a schematic diagram illustrating organization of wireless resources in an air interface utilizing orthogonal frequency divisional multiplexing (OFDM).

Referring now to FIG. 3, an expanded view of an exemplary slot 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols 310; and frequency is in the vertical direction with units of subcarriers 312.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers 312 in the frequency domain. In one example, an RB may include 12 subcarriers, a number independent of the numerology used. In some examples, depending on the numerology, an RB may include any suitable number of consecutive OFDM symbols 310 in the time domain.

A UE generally utilizes only a subset of the resource grid 304. An RB may be the smallest unit of resources that can be allocated to or reserved by a UE. Thus, the more RBs scheduled for or reserved by a UE, and the higher the modulation scheme chosen for the air interface, the higher the data rate for the UE.

In this illustration, the RB 308 is shown as occupying less than the entire bandwidth of the slot 302, with some subcarriers 312 illustrated above and below the RB 308. In a given implementation, the slot 302 may have a bandwidth corresponding to any number of one or more RBs 308. Further, in this illustration, the RB 308 is shown as occupying less than the entire duration of the slot 302, although this is merely one possible example.

The spectrum utilized to transmit the slot 300 may include licensed spectrum or unlicensed spectrum. Unlicensed spectrum may be employed by various types of wireless communication networks, such as Wi-Fi, Bluetooth, LTE-U (Long Term Evolution (LTE) in unlicensed spectrum), LAA (Licensed-Assisted Access), MuLTEfire, and V2X. For example, V2X may reside in the 5.9 GHz unlicensed band.

Figure 4:
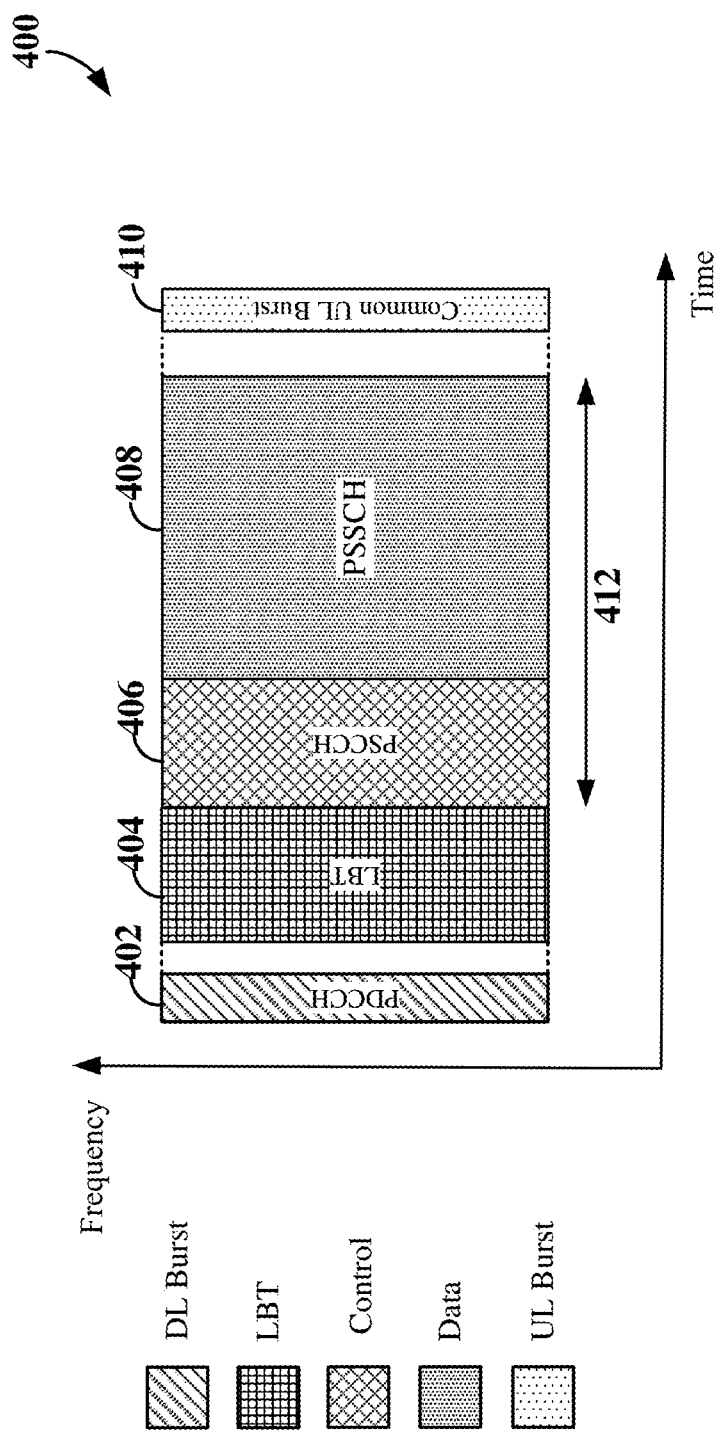
FIG. 4 illustrates an example of a slot that may be utilized to communicate over a V2X carrier.

In various aspects of the disclosure, V2X wireless communications may be transmitted over a V2X carrier including spectrum that is time-divided into a plurality of slots. FIG. 4 illustrates an example of a slot 400 that may be utilized to communicate over such a V2X carrier. In the example shown in FIG. 4, time is illustrated along a horizontal axis, while frequency is illustrated along a vertical axis.

In some examples, the slot 400 may be utilized for broadcast communication. A broadcast communication may refer to a point-to-multipoint transmission by one V2X device (e.g., a vehicle, roadside unit (RSU), UE of a pedestrian/cyclist, or other V2X device) to other V2X devices. In this example, the slot 400 includes a downlink (DL) burst 402, which may include a physical downlink control channel (PDCCH), in the initial of beginning portion of the slot 400. The DL burst 402 may include control information related to the slot 400 and may be transmitted by an RSU (base station) towards a plurality of V2X devices nearby the RSU. In some examples, the control information may include synchronization information to synchronize communication by a plurality of V2X devices on the V2X carrier.

The slot 400 further includes a listen-before-talk (LBT) section 404 within which V2X devices may perform listen-before-talk (LBT) to gain access to the V2X carrier. LBT enables fair sharing of the spectrum between the V2X devices. LBT is a contention-based protocol used in wireless communication that allows several wireless devices to utilize the same spectrum or channel. For example, before a V2X device can transmit a signal over the V2X carrier, the device may first check (listen) to determine that the V2X carrier is not currently in use. If the channel is not being used (e.g., the channel is idle or silent), the device can transmit the signal over the V2X carrier.

LBT may also utilize a back-off procedure in which a device having data to send generates a random back-off time after detecting the channel is idle, and then decrements a back-off timer initialized with the random back-off time until the channel becomes busy or the timer reaches zero. If the channel becomes busy prior to expiration of the back-off timer, the device may freeze the timer. When the back-off timer expires (or decrements to zero), the device may transmit the data if the channel remains idle.

The slot 400 may further include a control portion 406 and a data portion 408 that collectively form a transmit section 412 of the slot 400. Once a V2X device has gained access to the V2X carrier utilizing LBT within the LBT section 404, the V2X device may then transmit control information within the control portion 406 and data within the data portion 408 of the transmit section 412. In some examples, the control information may be transmitted within a physical sidelink control channel (PSCCH), while the data may be transmitted within a physical sidelink shared channel (PSSCH).

In some examples, the control information may include information related to the data, such as a modulation and coding scheme utilized for the data. The data may include V2X data, such as status information (e.g., position, speed, acceleration, trajectory, etc.) and/or event information (e.g., traffic jam, icy road, fog, pedestrian crossing the road, collision, etc.), and may also include video data captured by a camera on a vehicle or coupled to an RSU. In some examples, instead of transmitting control information within the control portion 406, the control portion 406 may be utilized to transmit additional data. In this example, the control information may be transmitted within the LBT section 404 of the slot 400.

The slot 400 may also include a common uplink (UL) burst 410, which may include a physical uplink control channel (PUCCH), in the end of the slot 400. The common UL burst 410 may include control information, such as a request to access the V2X network, transmitted from the V2X devices to the RSU. As illustrated in FIG. 4, the end of the DL burst 402 may be separated in time from the beginning of the LBT section 404 and the end of the transmit section 412 may be separated in time from the beginning of the UL burst 410. This time separation may sometimes be referred to as a gap, a guard period, a guard interval, and/or various other suitable terms. This separation may provide time for the various V2X devices to perform a switch-over between transmitting and receiving, or vice-versa.

To gain access to the V2X carrier, a V2X device may transmit a known preamble, referred to herein as an LBT sequence, within the LBT section 404 before the transmit section 412. The LBT sequence may indicate the start and total length in the frequency domain of the control and data to be subsequently transmitted by the V2X device. However, the number of LBT sequences may be limited, thus preventing flexible reservation of resources within the V2X carrier.

Various aspects of the disclosure enable a V2X device to flexibly reserve available resources within the V2X carrier and to indicate the start and length in the frequency domain of a subsequent transmission on the reserved resources within the LBT section 404. In some examples, a transmitting V2X device may encode a resource indication indicating the start and length in the frequency domain of the transmission to produce an encoded channel indicator that is transmitted by the V2X device within the LBT section 404. In addition, the position of the encoded channel indicator in terms of resource blocks (RBs) may be the same as the corresponding control and data subsequently transmitted by the V2X device.

Figure 5:
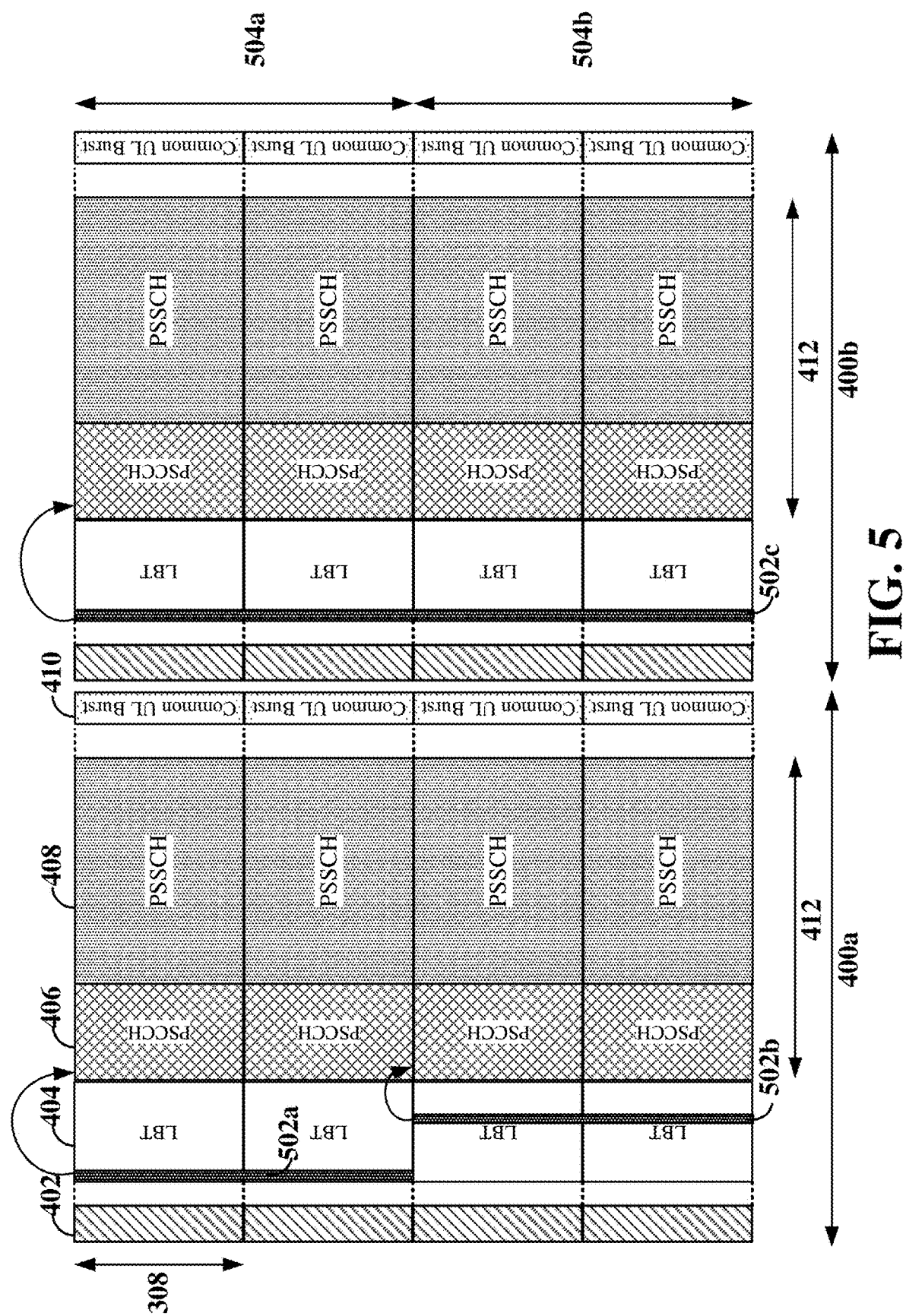
FIG. 5 illustrates examples of encoded channel indicators transmitted within listen-before-talk (LBT) sections of slots.

FIG. 5 illustrates examples of encoded channel indicators 502a, 502b, and 502c transmitted within listen-before-talk (LBT) sections 404 of slots 400a and 400b according to some aspects of the present disclosure. A receiving V2X device may decode each of the encoded channel indicators 502a, 502b, and 502c to identify a starting sub-channel (only two of which 504a and 504b are illustrated) and a set (number) of contiguous sub-channels of a subsequent transmission in the transmit section 512 of a slot 402a or 402b. Each sub-channel 504a and 504b includes a set of consecutive or contiguous resource blocks (RBs) 308, each including a number of consecutive or contiguous subcarriers in the frequency domain. In the example shown in FIG. 5, each sub-channel 504a and 504b includes two RBs 308. However, it should be understood that in other examples, each sub-channel 504a and 504b may include more than two RBs 308.

In some examples, each encoded channel indicator 502a, 502b, and 502c is transmitted over the same sub-channels 504a and/or 504b as the subsequent transmission in the corresponding transmit section 412 (control portion 406 and data portion 408) of the slot 400a or 400b. For example, encoded channel indicator 502a is shown transmitted within the LBT section 404 of slot 400a over sub-channel 504a. Encoded channel indicator 502a indicates that the starting sub-channel for a subsequent transmission within the transmit section 412 of slot 400a is sub-channel 504a and the set of contiguous sub-channels utilized for the transmission is one. Similarly, encoded channel indicator 502b is shown transmitted within the LBT section 404 of slot 400a over sub-channel 504b. Encoded channel indicator 502b indicates that the starting sub-channel for a subsequent transmission within the transmit section 412 of slot 400a is sub-channel 504b and the set of contiguous sub-channels utilized for the transmission is one. Likewise, encoded channel indicator 502c is shown transmitted within the LBT section 404 of slot 400b over sub-channels 504a and 504b. Encoded channel indicator 502c indicates that the starting sub-channel for a subsequent transmission within the transmit section 412 of slot 400b is sub-channel 504a and the set of contiguous sub-channels utilized for the transmission is two.

In some examples, a respective transmitting V2X device may encode each of the encoded channel indicators 502a, 502b, and 502c utilizing polar encoding. However, in other examples, other types of coding may be used, and the present disclosure is not limited to any particular type of coding. In some examples, the transmitting V2X device(s) may jointly polar encode respective resource indications of the starting sub-channel and the respective set of contiguous sub-channels to produce the encoded channel indicators 502a, 502b, and 502c. In some examples, the transmitting V2X device(s) may calculate a resource indicator value (RIV), as defined in LTE resource allocation Type 2, from the starting sub-channel and the number of contiguous channels selected for a transmission based on LBT and the amount of data to transmit. The transmitting V2X device(s) may then polar encode the RIV to produce the encoded channel indicator. By decoding each of the encoded channel indicators 502a, 502b, and 502c, a receiving V2X device may uniquely identify the starting and ending sub-channels 504a and/or 504b for each of the transmissions.

In some examples, the transmitting V2X device may further interleave a demodulation reference signal (DMRS) with the RIV information bits prior to coding. The DMRS may enable a receiving V2X device to perform channel estimation of the V2X carrier, which may enable coherent demodulation/detection of the control and/or data channels within the sub-channels.

Figure 6:
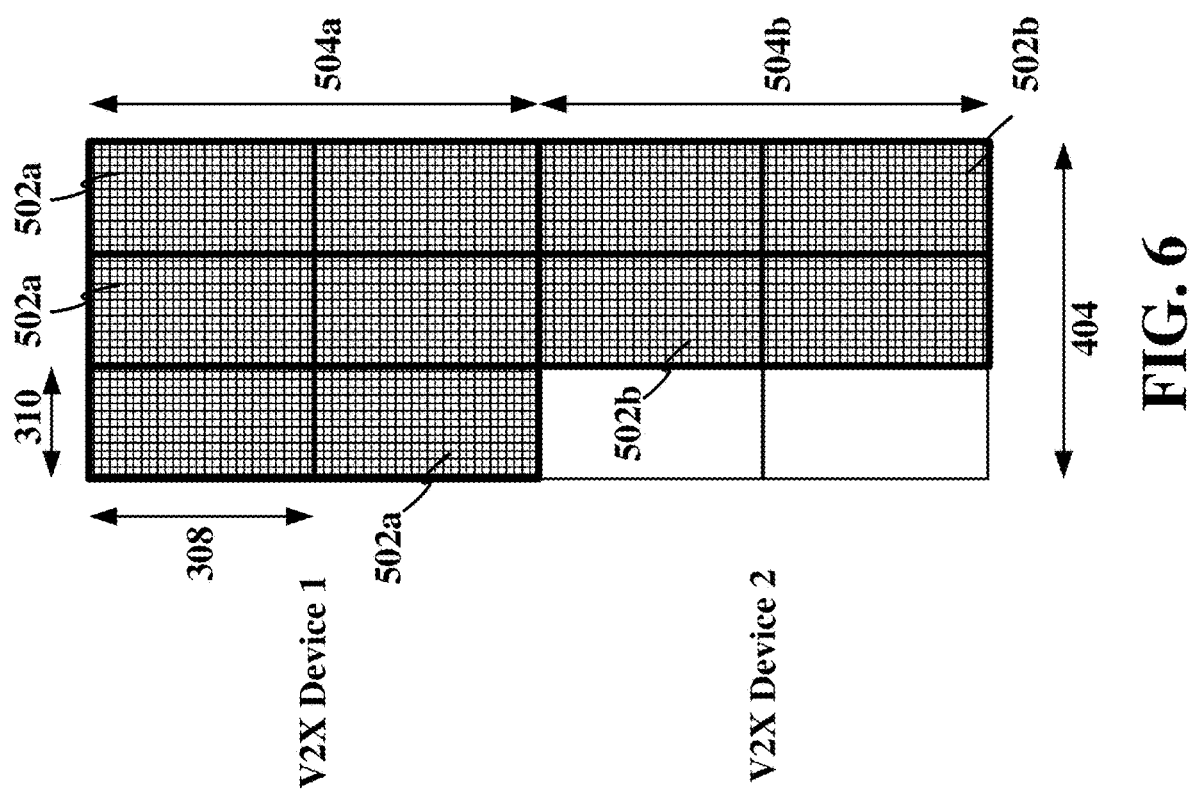
FIG. 6 illustrates examples of repeated transmissions of encoded channel indicators within an LBT section of a slot.

FIG. 6 illustrates examples of repeated transmissions of encoded channel indicators 502a and 502b within an LBT section 404 of a slot according to some aspects of the present disclosure. The LBT section 404 may include a plurality of OFDM symbols 310 in the time domain and a plurality of sub-channels in the frequency domain. In the example shown in FIG. 6, the LBT section 404 is divided into three OFDM symbols 310 in the time domain and two sub-channels 504a and 504b in the frequency domain. However, it should be understood that the slot may include any suitable number of sub-channels, each including any suitable number of RBs 308, and the LBT section 404 of the slot may include any suitable number of OFDM symbols 310.

In some examples, encoded channel indicators 502a and 502b may each be transmitted by a different V2X device utilizing LBT with back-off timers. For example, a first V2X device (V2X Device 1) with data to transmit may determine the number of sub-channels needed for a transmission, listen to the V2X carrier at the beginning of the LBT section 404, and initialize a back-off timer when at least the desired set (number) of contiguous sub-channels in the V2X carrier are idle. In the example shown in FIG. 6, V2X Device 1 may initialize the back-off timer with a value of zero such that the back-off timer of V2X Device 1 immediately expires, thus enabling V2X Device 1 to select resources (e.g., time-frequency resources) including a starting sub-channel and number of sub-channels for the transmission and begin transmission of the encoded channel indicator 502a in the first symbol 310 of the LBT section 404 over the selected sub-channels (e.g., sub-channel 504a). V2X Device 1 may then repeat transmission of the encoded channel indicator 502a within each subsequent symbol 310 of the LBT section 404. Thus, V2X Device 1 may transmit the encoded channel indicator 502a over the sub-channels (e.g., sub-channel 504a) selected for the transmission within the first symbol 310 of the LBT section 404 and each subsequent symbol 310 of the LBT section 404.

A second V2X device (V2X Device 2) with data to transmit may determine the number of sub-channels needed for a transmission and listen to the V2X carrier at the beginning of the LBT section 404. In the example shown in FIG. 6, V2X Device 2 needs one sub-channel for the transmission. Therefore, although V2X Device 1 began transmitting encoded channel indicator 502a over the first sub-channel 504a within the first symbol 310 of the LBT section 404, sub-channel 504b remained idle in the first symbol 310. Thus, V2X Device 2 may initialize the back-off timer with a value of one (corresponding to one symbol). Upon expiration of the back-off timer of V2X Device 2, V2X Device 2 may select idle resources (e.g., time-frequency resources) including a starting sub-channel and number of sub-channels for the transmission and begin transmission of the encoded channel indicator 502b in the second symbol 310 of the LBT section 404 over the selected sub-channels (e.g., sub-channel 504b). V2X Device 2 may then repeat transmission of the encoded channel indicator 502b within each subsequent symbol 310 of the LBT section 404. Thus, V2X Device 2 may transmit the encoded channel indicator 502b over the sub-channels (e.g., sub-channel 504b) selected for the transmission within the first symbol after expiration of the back-off timer (e.g., the second symbol 310 of the LBT section 404) and each subsequent symbol 310 of the LBT section 404.

Figure 7:
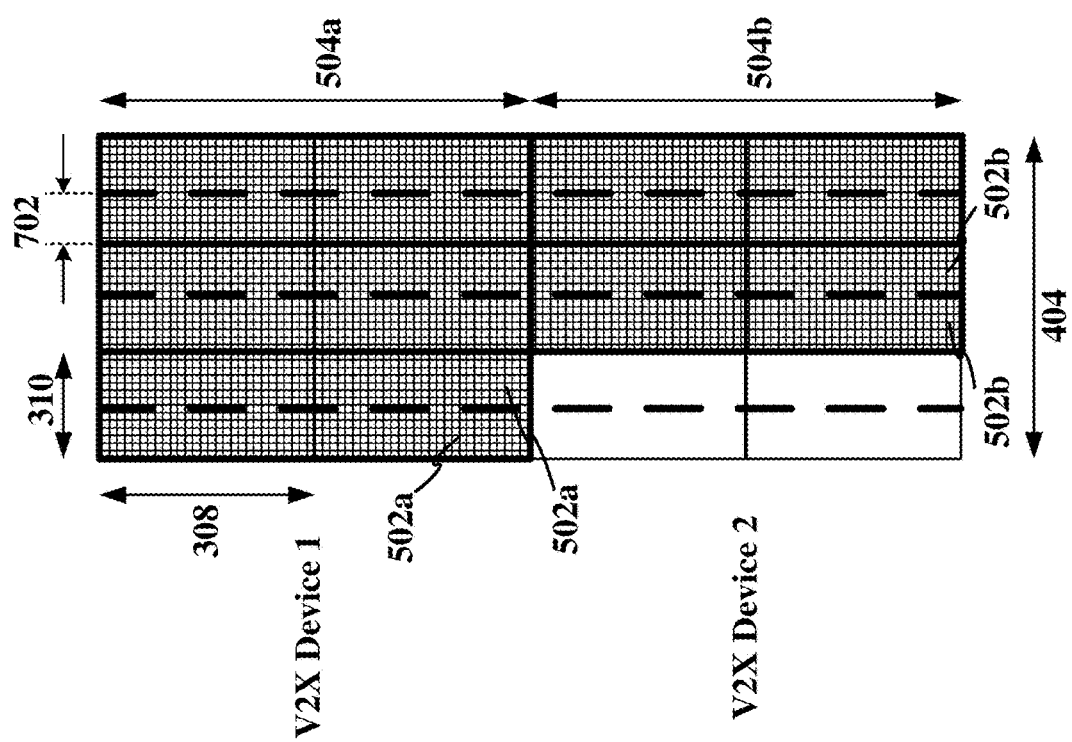
FIG. 7 illustrates examples of repeated transmissions of encoded channel indicators within half-symbols of an LBT section of a slot.

FIG. 7 illustrates examples of repeated transmissions of encoded channel indicators 502a and 502b within half-symbols of an LBT section 404 of a slot according to some aspects of the present disclosure. In the example shown in FIG. 7, each of the symbols 310 may be time-divided into half-symbols 702, and each V2X device transmitting an encoded channel indicator 502a or 502b may transmit the entire encoded channel indicator 502a or 502b within each half-symbol 702 based on LBT.

For example, V2X Device 1 may initialize the back-off timer with a value of zero such that the back-off timer of V2X Device 1 immediately expires at the beginning of the LBT section 404, thus enabling V2X Device 1 to select resources (e.g., time-frequency resources) including a starting sub-channel and number of sub-channels for the transmission and begin transmission of the encoded channel indicator 502a in the first symbol 310 of the LBT section 404 over the selected sub-channels (e.g., sub-channel 504a). In the example shown in FIG. 7, V2X Device 1 may transmit the encoded channel indicator 502a within a first half 702 of the first symbol 310 and then repeat transmission of the encoded channel indicator 502a within the second half 702 of the first symbol 310. V2X Device 1 may further repeat transmission of the encoded channel indicator 502 within each subsequent half-symbol 702 of the LBT section 404.

Similarly, V2X Device 2 may initialize the back-off timer with a value of one (corresponding to one symbol) at the beginning of the LBT section 404. Upon expiration of the back-off timer of V2X Device 2, V2X Device 2 may select idle resources (e.g., time-frequency resources) including a starting sub-channel and number of sub-channels for the transmission and begin transmission of the encoded channel indicator 502b in the second symbol 310 of the LBT section 404 over the selected sub-channels (e.g., sub-channel 504b). In the example shown in FIG. 7, V2X Device 2 may transmit the encoded channel indicator 502b within a first half 702 of the second symbol 310 and then repeat transmission of the encoded channel indicator 502b within the second half 702 of the second symbol 310. V2X Device 2 may then repeat transmission of the encoded channel indicator 502b within each subsequent half-symbol 702 of the LBT section 404. By transmitting the encoded channel indicators 502a and 502b within half-symbols, receiving V2X devices may implement automatic gain control (AGC) within a first half of a symbol to enable the V2X devices to receive the encoded channel indicator 502a and/or 502b within the second half of the symbol.

Figure 8:
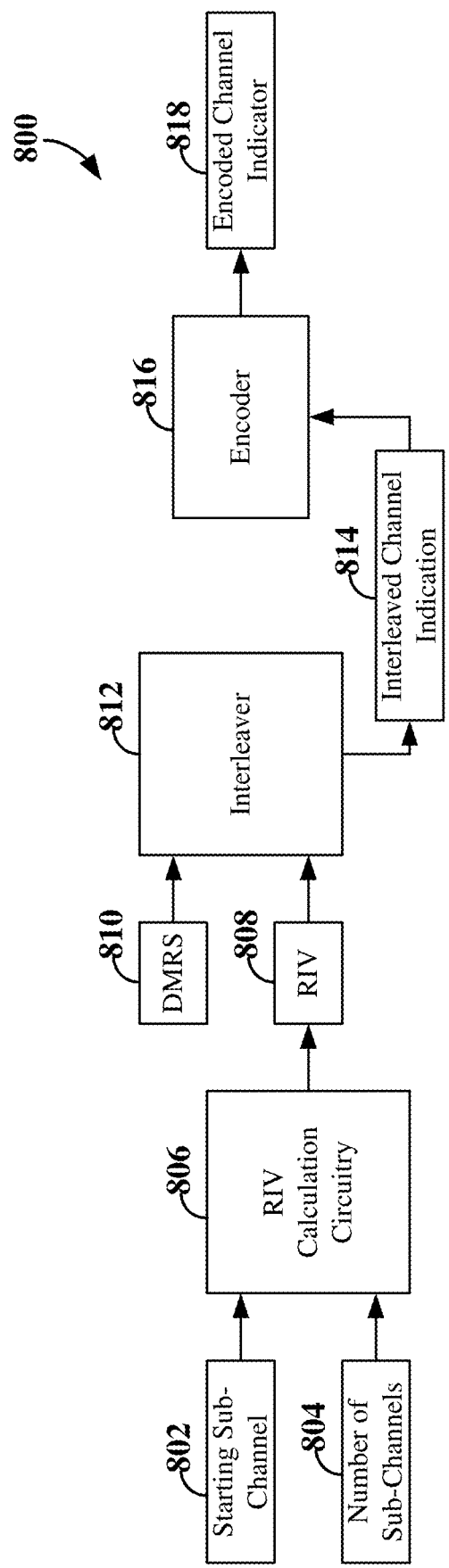
FIG. 8 is a block diagram illustrating an example of V2X communication circuitry.

FIG. 8 is a block diagram illustrating an example of V2X communication circuitry 800 for generating an encoded channel indicator 818 according to some aspects of the present disclosure. The V2X communication circuitry 800 includes RIV calculation circuitry 806 configured to receive a starting sub-channel 802 and a set (number) of contiguous sub-channels 804 (beginning with the starting sub-channel 802) for a transmission. The starting sub-channel 802 and set of contiguous sub-channels 804 may be selected based on LBT and the amount and/or type of data to be transmitted. The RIV calculation circuitry 806 calculates an RIV 808, as defined in LTE resource allocation Type 2, from the starting sub-channel 802 and the set of contiguous sub-channels 804.

The information bits of the RIV 808 may be interleaved with the bits of a demodulation reference signal (DMRS) 810 by an interleaver 812 to produce an interleaved channel indicator 814. An encoder 816 may then encode the interleaved channel indicator 814 using, for example, polar coding, to produce an encoded channel indicator 818 that may be transmitted over the selected sub-channels within one or more symbols of an LBT section of a slot.

Figure 9:
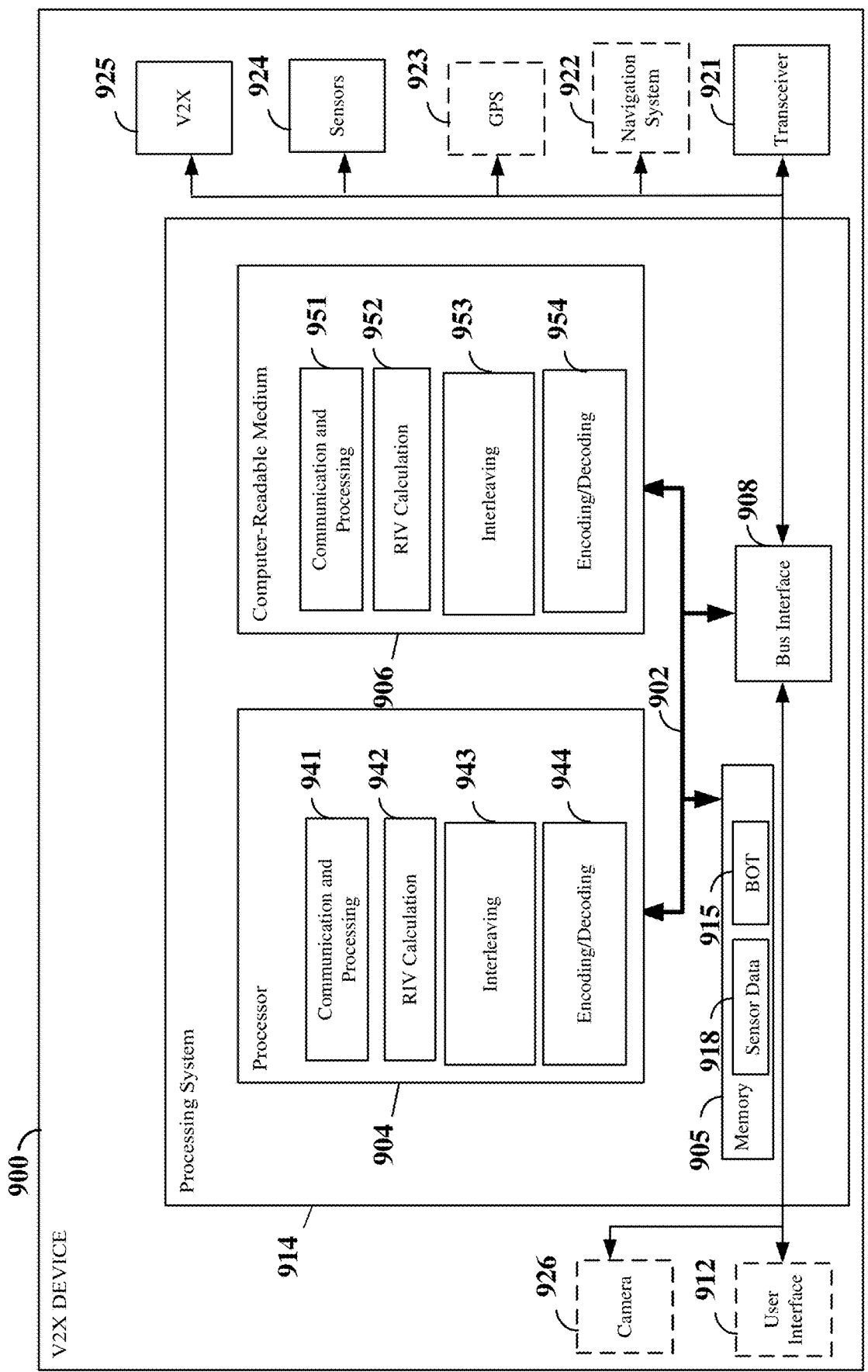
FIG. 9 is a block diagram illustrating an example of a hardware implementation for a V2X apparatus employing a processing system.

FIG. 9 is a block diagram illustrating an example of a hardware implementation for a V2X device 900 employing a processing system 914. For example, the V2X device 900 may correspond to a vehicle, mobile or wearable device of a pedestrian/cyclist, or RSU, as shown and described above in reference to FIG. 2.

The V2X device 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the V2X device 900 may be configured to perform any one or more of the functions described herein. That is, the processor 904, as utilized in the V2X device 900, may be used to implement any one or more of the processes and procedures described below.

In this example, the processing system 914 may be implemented with a bus architecture, represented generally by the bus 902. The bus 902 may include any number of interconnecting buses and bridges depending on the specific application of the processing system 914 and the overall design constraints. The bus 902 links together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further.

A bus interface 908 provides an interface between the bus 902 and a transceiver 921. The transceiver 921 provides a means for communicating with various other apparatus over a transmission medium (e.g., air interface). Depending upon the nature of the apparatus, a user interface 912 (e.g., keypad, display, touch screen, speaker, microphone, control knobs, etc.) may also be provided. Of course, such a user interface 912 is optional, and may be omitted in some examples, such as a RSU. The bus interface 908 further provides an interface between the bus 902 and one or more peripherals. For example, peripherals may include an optional navigation system 922, an optional global positioning system (GPS) receiver 923, one or more sensors 924, a vehicle-to-everything (V2X) system 925, and/or an optional camera 926.

The V2X system 925 may be configured to obtain V2X data 918 from the navigation system 922, GPS receiver 923, sensors 924, and/or camera 926. In addition, the V2X communication system 925 may be configured to receive V2X data 918 from one or more neighbor V2X devices (e.g., vehicles, mobile devices of pedestrians, RSU's, etc., within a range of the V2X communication system 925) or from a V2X server via the transceiver 921. In examples in which the V2X device 900 is a vehicle, the V2X data 918 may include one or more of a position (e.g., coordinates) of the vehicle and/or neighbor vehicle(s), a speed of the vehicle and/or neighbor vehicle(s), a trajectory of the vehicle and/or neighbor vehicle(s), a route of the vehicle and/or neighbor vehicle(s), traffic information, weather information, road hazard information, the location of one or more pedestrians or cyclists, etc. In addition, the V2X data 918 may include video data captured from the camera 926 attached to the V2X device or received from another V2X device. The V2X data 918 may be maintained, for example, within memory 905 and may further be transmitted to another V2X device via the transceiver 921.

The V2X system 925 may further communicate with the user interface 912 to enable a passenger or user in the vehicle cabin to interact with the V2X system. For example, the V2X system 925 may provide alerts or other information obtained from the V2X data to the user via the user interface 912. In some examples, the V2X system 925 may further control one or more components (not shown) of the V2X system to facilitate automated driving and/or assisted driving (e.g., control braking and/or steering for collision-avoidance).

The navigation system 922 provides a means for mapping or planning a route to one or more destinations for the V2X device 900. In the illustrated example, the navigation system 922 is illustrated external to the processing system 914; however, in another example, the navigation system 922 may be internal to the processing system 914, e.g., operational by the processor 904 utilizing software stored on the computer-readable medium 906. The GPS receiver 923 provides a means for communicating with a plurality of GPS satellites and determining position, speed, and trajectory information of the V2X device 900. The one or more sensors 924 may include any suitable set of one or more sensors, including, for example, sensors for determining whether the V2X device 900 is braking or accelerating. The set of sensors 924 may further include other types of gauges, such as a speedometer. The camera 926 may include a back-up camera or other camera attached to the V2X device. For example, when the V2X device 900 is an RSU, the camera 926 may include a traffic camera attached to a traffic light or tollbooth.

The processor 904 is responsible for managing the bus 902 and general processing, including the execution of software stored on the computer-readable medium 906. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 904, causes the processing system 914 to perform the various functions described below for any particular apparatus. The computer-readable medium 906 and the memory 905 may also be used for storing data that is manipulated by the processor 904 when executing software.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. In some examples, the computer-readable medium 906 may be part of the memory 905. Those skilled in the art will recognize how best to implement the described functionality presented throughout this disclosure depending on the particular application and the overall design constraints imposed on the overall system.

In some aspects of the disclosure, the processor 904 may include circuitry configured for various functions. For example, the processor 904 may include communication and processing circuitry 941 configured to communicate over a V2X carrier to exchange V2X data with other V2X devices. In some examples, the communication and processing circuitry 941 may be configured to transmit or receive a PDCCH (e.g., an RSU may transmit the PDCCH, while other V2X devices may receive the PDCCH) at the start of a slot. The communication and processing circuitry 941 may further operate in coordination with the V2X system 925 to determine whether the V2X device 900 has generated or obtained V2X data 918 to be transmitted to other V2X devices.

If there is V2X data to transmit, the communication and processing circuitry 941 may identify a set (number) of contiguous sub-channels necessary to transmit the V2X data 918. The communication and processing circuitry 941 may further initiate LBT after the PDCCH to listen to the V2X carrier. As part of LBT, the communication and processing circuitry 941 may further be configured to initialize a back-off timer (BOT) 915 at the start of an LBT section of the slot when at least the necessary set of contiguous sub-channels within the V2X carrier are idle. Upon expiration of the BOT 915, the communication and processing circuitry 941 may select resources (e.g., time-frequency resources) within the V2X carrier for the transmission of the V2X data 918. The communication and processing circuitry 941 may then transmit the V2X data 918 over the selected sub-channels within a data portion of a transmit section of the slot. The communication and processing circuitry 941 may further generate and transmit control information (e.g., MCS) within a control portion of the transmit section of the slot prior to the V2X data.

The communication and processing circuitry 941 may further be configured to communicate with a V2X server via a base station (e.g., eNB or gNB) over licensed spectrum allocated to an LTE or NR wireless communication network. For example, the communication and processing circuitry 941 may be configured to receive broadcast V2X data (e.g., weather, traffic, map data, etc.) from the V2X server and/or generate and transmit a unicast message to the V2X server for latency-tolerant use cases via the transceiver 921. The communication and processing circuitry 941 may further be configured to execute communication and processing software 951 to implement one or more functions described herein.

The processor 904 may further include RIV calculation circuitry 942, which may, in some examples, correspond to the RIV calculation circuitry 806 shown in FIG. 8. The RIV calculation circuitry 942 may be configured to receive a resource indication indicating a starting sub-channel and a set (number) of contiguous sub-channels selected for a transmission of V2X data 918 from the communication and processing circuitry 941 and to calculate a RIV therefrom. The RIV calculation circuitry 942 may further be configured to execute RIV calculation software 952 to implement one or more functions described herein.

The processor 904 may further include interleaving circuitry 943, which may, in some examples, correspond to the interleaver 812 shown in FIG. 8. The interleaving circuitry 943 may be configure to interleave the RIV 810 with a DMRS generated by the communication and processing circuitry 941 to produce an interleaved channel indication, as generally described above in reference to FIG. 8. The interleaving circuitry 943 may further be configured to execute interleaving software 953 to implement one or more functions described herein.

The processor 904 may further include encoding/decoding circuitry 944, which may, in some examples, correspond to the encoder 816 shown in FIG. 8. In some examples, the encoding/decoding circuitry 944 may utilize polar encoding. However, in other examples, other types of coding may be used, and the present disclosure is not limited to any particular type of coding. In some examples, the encoding/decoding circuitry 944 may be configured to encode the interleaved channel indication produced by the interleaving circuitry 943 to produce an encoded channel indicator. In other examples, the encoding/decoding circuitry 944 may be configured to encode the RIV without prior interleaving with a DMRS to produce the encoded channel indicator. In still other examples, the encoding/decoding circuitry 944 may be configured to jointly polar code respective resource indications of the starting sub-channel and the set of contiguous sub-channels to produce the encoded channel indicator.

The encoding/decoding circuitry 944 may further provide the encoded channel indicator to the communication and processing circuitry 941 to transmit the encoded channel indicator over the selected sub-channels within at least one symbol of the LBT section of the slot via the transceiver 921. For example, the communication and processing circuitry 941 may transmit the encoded channel indicator within the first symbol or half-symbol after expiration of the BOT 915 and on each symbol or half-symbol in the LBT section subsequent thereto.

The communication and processing circuitry 941 may further be configured to receive an encoded channel indicator within an LBT section of a slot via the transceiver 921 and to provide the encoded channel indicator to the encoding/decoding circuitry 944 to decode the encoded channel indicator and identify the starting sub-channel and set (number) of contiguous sub-channels of a subsequent transmission to be received within the transmit section of the slot. In examples in which the encoded channel indicator includes a RIV indicating the starting sub-channel and set of contiguous sub-channels, the information bits of the RIV may further be interleaved with a demodulation reference signal (DMRs) as an interleaved channel indicator. In this example, the interleaving circuitry 943 may further be configured to de-interleave the interleaved channel indicator to obtain the RIV and DMRS and provide the RIV and DMRS to the communication and processing circuitry 941. The encoding/decoding circuitry 944 may further be configured to execute encoding/decoding software 954 to implement one or more of the functions described herein.

Figure 10:
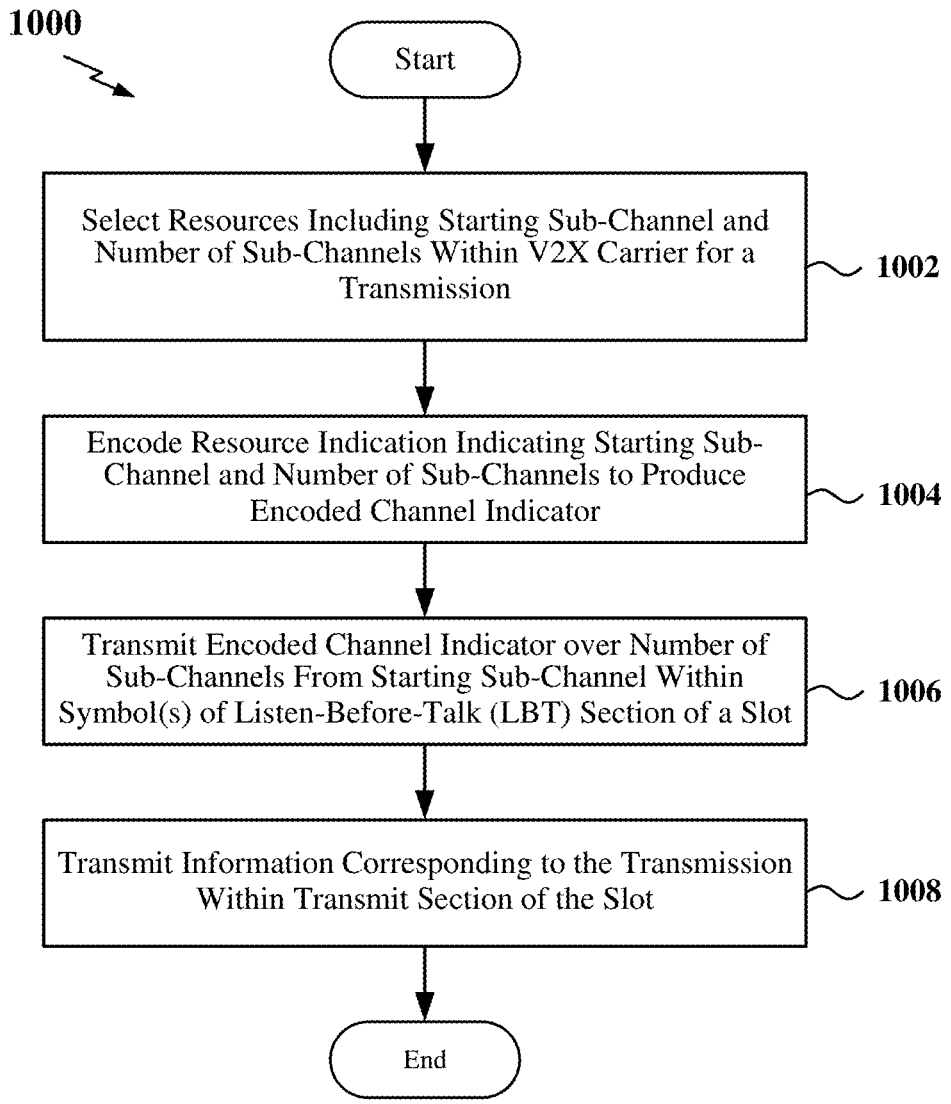
FIG. 10 is a flow chart of an exemplary method for wireless communication over a V2X carrier.

FIG. 10 is a flow chart 1000 of a method for wireless communication over a V2X carrier. As described below, some or all illustrated features may be omitted in a particular implementation within the scope of the present disclosure, and some illustrated features may not be required for implementation of all embodiments. In some examples, the method may be performed by the V2X device 900, as described above and illustrated in FIG. 9, by a processor or processing system, or by any suitable means for carrying out the described functions.

At block 1002, the V2X device may select resources including a starting sub-channel and a set (number) of contiguous sub-channels within the V2X carrier for a transmission. In some examples, the V2X device may select the resources based on the amount and/or type of V2X data to transmit and LBT. For example, the communication and processing circuitry 941 shown and described above in connection with FIG. 9 may select resources for a transmission over a set of contiguous sub-channels of a V2X carrier.

At block 1004, the V2X device may encode a resource indication indicating the starting sub-channel and the set of contiguous sub-channels selected for the transmission to produce an encoded channel indicator. In some examples, the V2X device may encode the starting sub-channel and set of contiguous sub-channels using polar coding. In some examples, a resource indicator value (RIV) may be calculated from the starting sub-channel and the set of contiguous sub-channels, and the RIV may be polar encoded. In some examples, the RIV may be interleaved with a demodulation reference signal (DMRS) prior to encoding. For example, the encoding/decoding circuitry 944 shown and described above in connection with FIG. 9 may encode the resource indication indicating the starting sub-channel and number of contiguous channels to produce the encoded channel indicator.

At block 1006, the V2X device may transmit the encoded channel indicator over the set of contiguous sub-channels starting from the starting sub-channel (i.e., the starting sub-channel is the first sub-channel in the set of contiguous sub-channels) within at least one symbol of a listen-before-talk (LBT) section of a slot. In some examples, the V2X device may utilize a back-off timer during LBT, and may transmit the encoded channel indicator within the first symbol after expiration of the back-off timer. In some examples, the V2X device may repeat the transmission of the encoded channel indicator within each subsequent symbol (or half-symbol) of the LBT section of the slot. For example, the communication and processing circuitry 941 shown and described above in connection with FIG. 9 may transmit the encoded channel indicator via the transceiver 921.

At block 1008, the V2X device may transmit information corresponding to the transmission within a transmit section of the slot. The transmission may occupy the contiguous number of sub-channels beginning with the starting sub-channel. In some examples, the V2X device may transmit the V2X data within the transmit section of the slot. In other examples, the V2X device may transmit control information related to the V2X data within a control portion of the transmit section, and the V2X data within a data portion of the transmit section. As an example, the control information may be transmitted within a physical sidelink control channel, whereas the V2X data may be transmitted within a physical sidelink shared channel. For example, the communication and processing circuitry 941 shown and described above in connection with FIG. 9 may transmit the information corresponding to the transmission in the transmit section of the slot via the transceiver 921.

Figure 11:
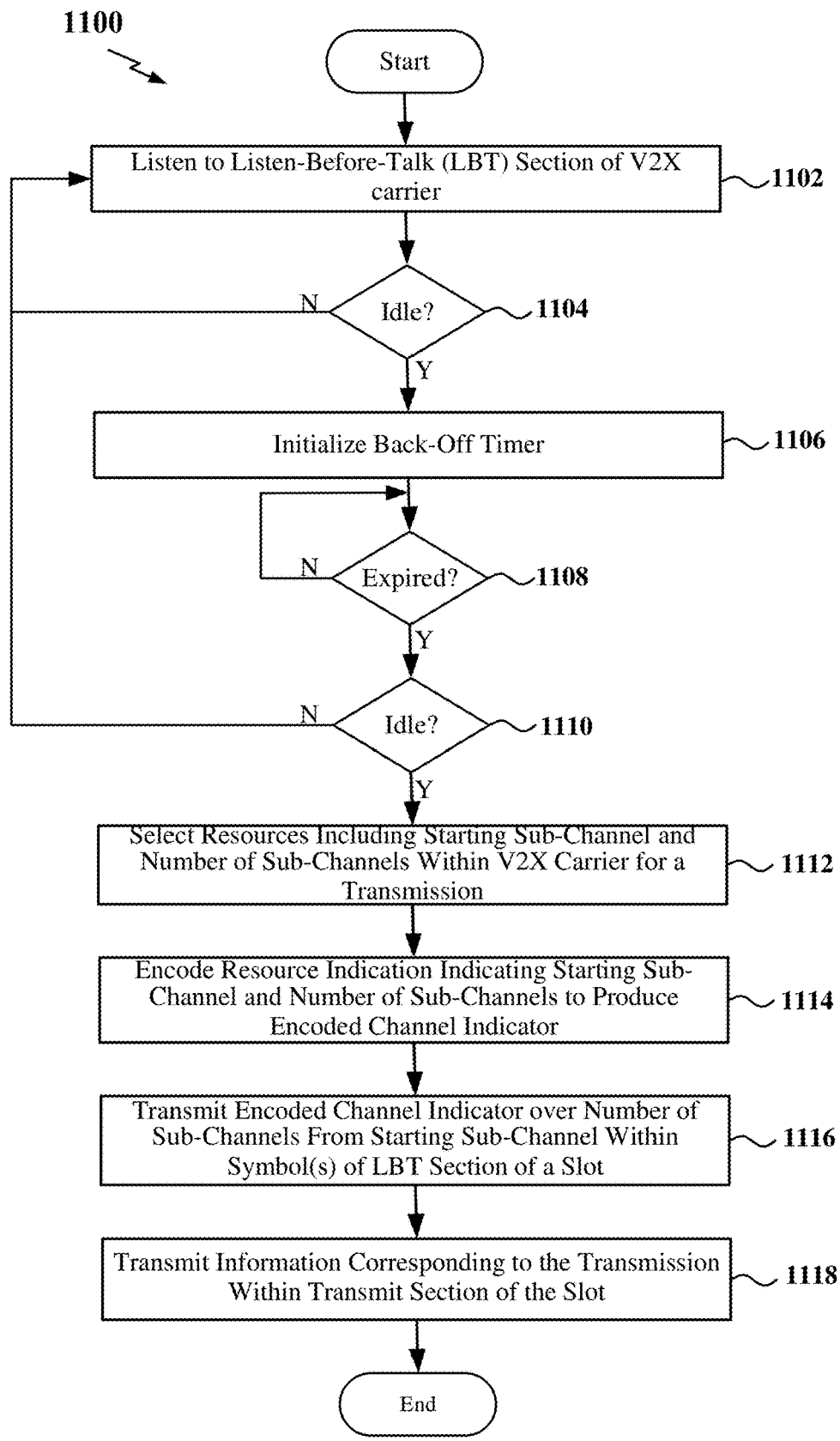
FIGS. 11-22 are flow charts illustrating exemplary methods for wireless communication over a V2X carrier.

FIG. 11 is a flow chart 1100 of another method for wireless communication over a V2X carrier. As described below, some or all illustrated features may be omitted in a particular implementation within the scope of the present disclosure, and some illustrated features may not be required for implementation of all embodiments. In some examples, the method may be performed by the V2X device 900, as described above and illustrated in FIG. 9, by a processor or processing system, or by any suitable means for carrying out the described functions.

At block 1102, the V2X device may listen to a V2X carrier at the beginning of a listen-before-talk (LBT) section of a slot to determine, at block 1104, whether at least a desired set (number) of contiguous sub-channels of the V2X carrier are idle. For example, the communication and processing circuitry 941 shown and described above in connection with FIG. 9 may listen to the V2X carrier to determine whether the channel is idle.

If at least the desired set of contiguous sub-channels in the V2X carrier are idle at the start of an LBT section of the slot (Y branch of block 1104), at block 1106, the V2X device may initialize a back-off timer (BOT). At block 1108, the V2X may determine whether the BOT has expired. Upon expiration of the BOT (Y brand of block 1108), at block 1110, the V2X device may determine whether at least the desired set of contiguous sub-channels of the V2X carrier remain idle. For example, the communication and processing circuitry 941 shown and described above in connection with FIG. 9 may initialize the back-off timer 915, and upon expiration thereof, determine whether the V2X carrier remains idle.

If at least the desired set of contiguous sub-channels of the V2X carrier remain idle (Y branch of block 1110), at block 1112, the V2X device may select resources including a starting sub-channel and a set of contiguous sub-channels within the V2X carrier for a transmission. In some examples, the V2X device may select the resources based on the amount and/or type of V2X data to transmit and LBT. For example, the communication and processing circuitry 941 shown and described above in connection with FIG. 9 may select resources for a transmission over a set of contiguous sub-channels of a V2X carrier.

At block 1114, the V2X device may encode a resource indication indicating the starting sub-channel and the set of contiguous sub-channels selected for the transmission to produce an encoded channel indicator. In some examples, the V2X device may encode the starting sub-channel and set of contiguous sub-channels using polar coding. In some examples, a resource indicator value (RIV) may be calculated from the starting sub-channel and the set of contiguous sub-channels, and the RIV may be polar encoded. In some examples, the RIV may be interleaved with a demodulation reference signal (DMRS) prior to encoding. For example, the encoding/decoding circuitry 944 shown and described above in connection with FIG. 9 may encode the resource indication indicating the starting sub-channel and number of contiguous channels to produce the encoded channel indicator.

At block 1116, the V2X device may transmit the encoded channel indicator over the set of contiguous sub-channels starting from the starting sub-channel (i.e., the starting sub-channel is the first sub-channel in the set of contiguous sub-channels) within at least one symbol after expiration of the BOT within a listen-before-talk (LBT) section of a slot. In some examples, the V2X device may transmit the encoded channel indicator within the first symbol after expiration of the back-off timer. In some examples, the V2X device may repeat the transmission of the encoded channel indicator within each subsequent symbol (or half-symbol) of the LBT section of the slot. For example, the communication and processing circuitry 941 shown and described above in connection with FIG. 9 may transmit the encoded channel indicator via the transceiver 921.

At block 1118, the V2X device may transmit information corresponding to the transmission within a transmit section of the slot. The transmission may occupy the contiguous number of sub-channels beginning with the starting sub-channel. In some examples, the V2X device may transmit the V2X data within the transmit section of the slot. In other examples, the V2X device may transmit control information related to the V2X data within a control portion of the transmit section, and the V2X data within a data portion of the transmit section. As an example, the control information may be transmitted within a physical sidelink control channel, whereas the V2X data may be transmitted within a physical sidelink shared channel. For example, the communication and processing circuitry 941 shown and described above in connection with FIG. 9 may transmit the information corresponding to the transmission in the transmit section of the slot via the transceiver 921.

Figure 12:
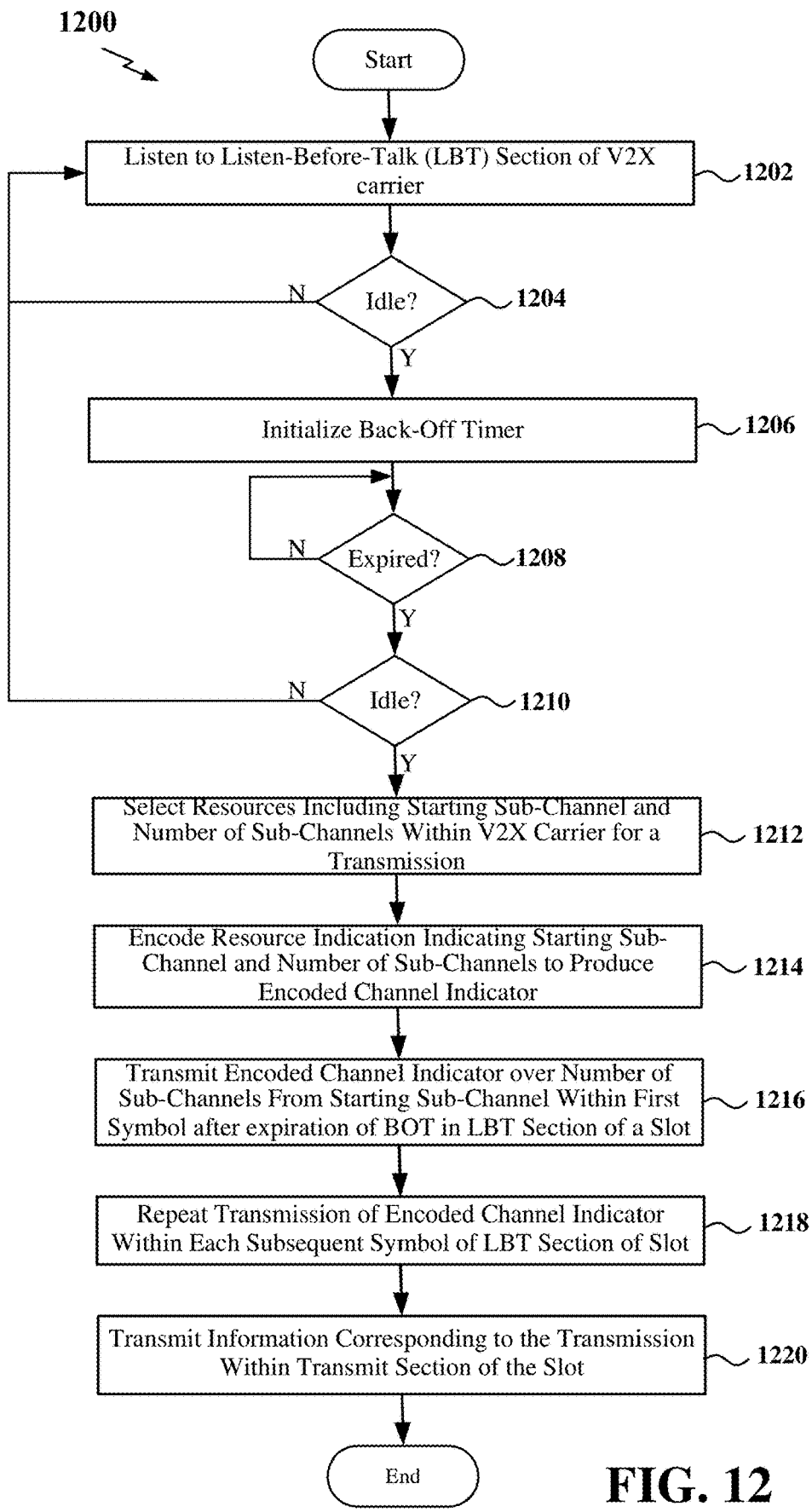

FIG. 12 is a flow chart 1200 of another method for wireless communication over a V2X carrier. As described below, some or all illustrated features may be omitted in a particular implementation within the scope of the present disclosure, and some illustrated features may not be required for implementation of all embodiments. In some examples, the method may be performed by the V2X device 900, as described above and illustrated in FIG. 9, by a processor or processing system, or by any suitable means for carrying out the described functions.

At block 1202, the V2X device may listen to a V2X carrier at the beginning of a listen-before-talk (LBT) section of a slot to determine, at block 1204, whether at least a desired set (number) of contiguous sub-channels of the V2X carrier are idle. For example, the communication and processing circuitry 941 shown and described above in connection with FIG. 9 may listen to the V2X carrier to determine whether the channel is idle.

If at least the desired set of contiguous sub-channels in the V2X carrier are idle at the start of an LBT section of the slot (Y branch of block 1204), at block 1206, the V2X device may initialize a back-off timer (BOT). At block 1208, the V2X may determine whether the BOT has expired. Upon expiration of the BOT (Y brand of block 1208), at block 1210, the V2X device may determine whether at least the desired set of contiguous sub-channels of the V2X carrier remain idle. For example, the communication and processing circuitry 941 shown and described above in connection with FIG. 9 may initialize the back-off timer, and upon expiration thereof, determine whether the V2X carrier remains idle.

If at least the desired set of contiguous sub-channels of the V2X carrier remain idle (Y branch of block 1210), at block 1212, the V2X device may select resources including a starting sub-channel and a set of contiguous sub-channels within the V2X carrier for a transmission. In some examples, the V2X device may select the resources based on the amount and/or type of V2X data to transmit and LBT. For example, the communication and processing circuitry 941 shown and described above in connection with FIG. 9 may select resources for a transmission over a set of contiguous sub-channels of a V2X carrier.

At block 1214, the V2X device may encode a resource indication indicating the starting sub-channel and the set of contiguous sub-channels selected for the transmission to produce an encoded channel indicator. In some examples, the V2X device may encode the starting sub-channel and set of contiguous sub-channels using polar coding. In some examples, a resource indicator value (RIV) may be calculated from the starting sub-channel and the set of contiguous sub-channels, and the RIV may be polar encoded. In some examples, the RIV may be interleaved with a demodulation reference signal (DMRS) prior to encoding. For example, the encoding/decoding circuitry 944 shown and described above in connection with FIG. 9 may encode the resource indication indicating the starting sub-channel and number of contiguous channels to produce the encoded channel indicator.

At block 1216, the V2X device may transmit the encoded channel indicator over the set of contiguous sub-channels starting from the starting sub-channel (i.e., the starting sub-channel is the first sub-channel in the set of contiguous sub-channels) within a first symbol after expiration of the BOT within the LBT section of a slot. For example, the communication and processing circuitry 941 shown and described above in connection with FIG. 9 may transmit the encoded channel indicator via the transceiver 921.

At block 1218, the V2X device may repeat the transmission of the encoded channel indicator over the set of contiguous sub-channels starting from the starting sub-channel within each subsequent symbol of the LBT section of the slot. For example, the communication and processing circuitry 941 shown and described above in connection with FIG. 9 may repeat transmission of the encoded channel indicator via the transceiver 921.

At block 1220, the V2X device may transmit information corresponding to the transmission within a transmit section of the slot. The transmission may occupy the contiguous number of sub-channels beginning with the starting sub-channel. In some examples, the V2X device may transmit the V2X data within the transmit section of the slot. In other examples, the V2X device may transmit control information related to the V2X data within a control portion of the transmit section, and the V2X data within a data portion of the transmit section. As an example, the control information may be transmitted within a physical sidelink control channel, whereas the V2X data may be transmitted within a physical sidelink shared channel. For example, the communication and processing circuitry 941 shown and described above in connection with FIG. 9 may transmit the information corresponding to the transmission in the transmit section of the slot via the transceiver 921.

Figure 13:
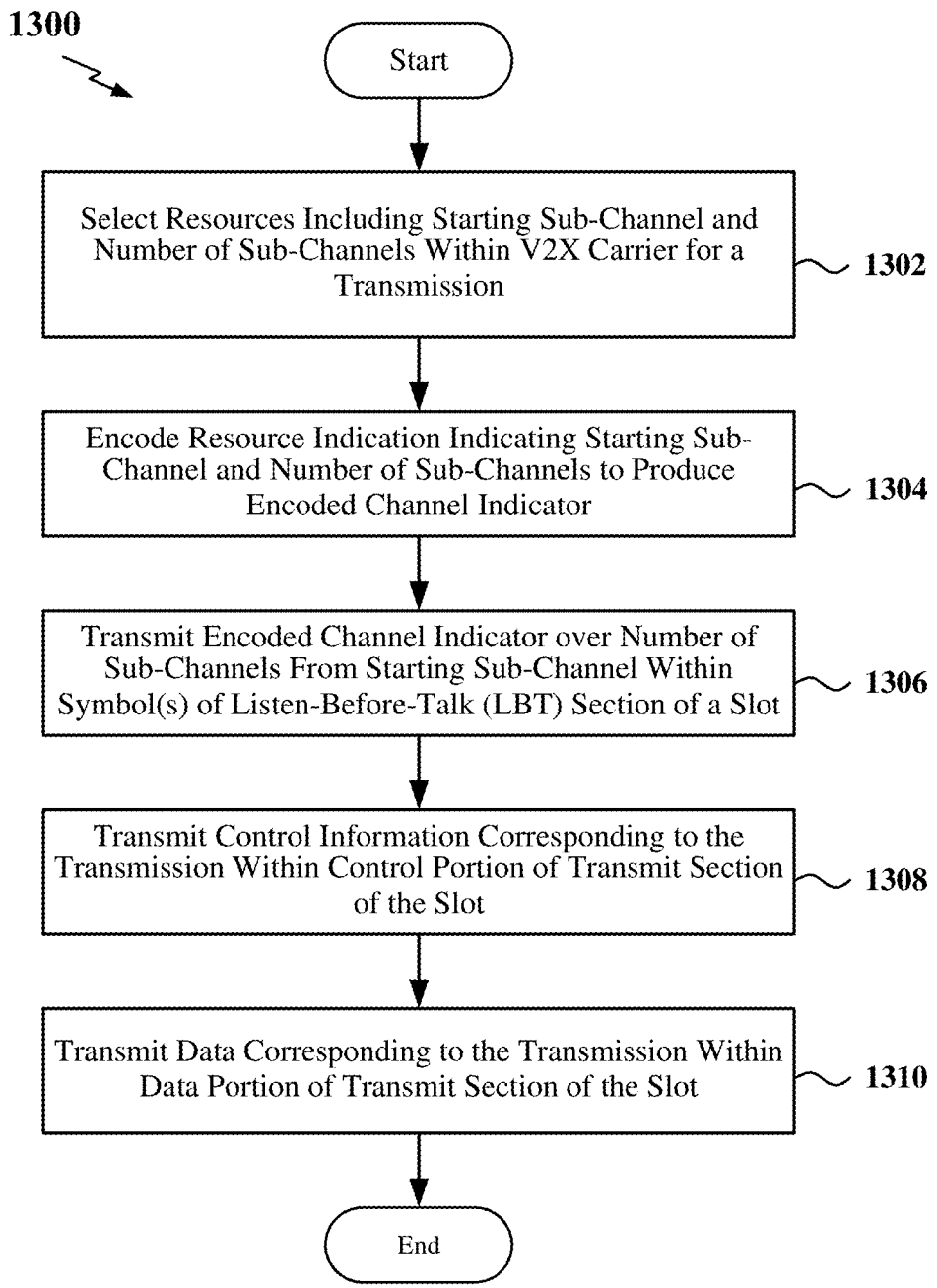

FIG. 13 is a flow chart 1300 of another method for wireless communication over a V2X carrier. As described below, some or all illustrated features may be omitted in a particular implementation within the scope of the present disclosure, and some illustrated features may not be required for implementation of all embodiments. In some examples, the method may be performed by the V2X device 900, as described above and illustrated in FIG. 9, by a processor or processing system, or by any suitable means for carrying out the described functions.

At block 1302, the V2X device may select resources including a starting sub-channel and a set (number) of contiguous sub-channels within the V2X carrier for a transmission. In some examples, the V2X device may select the resources based on the amount and/or type of V2X data to transmit and LBT. For example, the communication and processing circuitry 941 shown and described above in connection with FIG. 9 may select resources for a transmission over a set of contiguous sub-channels of a V2X carrier.

At block 3004, the V2X device may encode a resource indication indicating the starting sub-channel and the set of contiguous sub-channels selected for the transmission to produce an encoded channel indicator. In some examples, the V2X device may encode the starting sub-channel and set of contiguous sub-channels using polar coding. In some examples, a resource indicator value (RIV) may be calculated from the starting sub-channel and the set of contiguous sub-channels, and the RIV may be polar encoded. In some examples, the RIV may be interleaved with a demodulation reference signal (DMRS) prior to encoding. For example, the encoding/decoding circuitry 944 shown and described above in connection with FIG. 9 may encode the resource indication indicating the starting sub-channel and number of contiguous channels to produce the encoded channel indicator.

At block 1306, the V2X device may transmit the encoded channel indicator over the set of contiguous sub-channels starting from the starting sub-channel (i.e., the starting sub-channel is the first sub-channel in the set of contiguous sub-channels) within at least one symbol of a listen-before-talk (LBT) section of a slot. In some examples, the V2X device may utilize a back-off timer during LBT, and may transmit the encoded channel indicator within the first symbol after expiration of the back-off timer. In some examples, the V2X device may repeat the transmission of the encoded channel indicator within each subsequent symbol (or half-symbol) of the LBT section of the slot. For example, the communication and processing circuitry 941 shown and described above in connection with FIG. 9 may transmit the encoded channel indicator via the transceiver 921.

At block 1308, the V2X device may transmit control information corresponding to the transmission within a control portion of a transmit section of the slot. The transmission may occupy the contiguous number of sub-channels beginning with the starting sub-channel. As an example, the control information may be transmitted within a physical sidelink control channel. For example, the communication and processing circuitry 941 shown and described above in connection with FIG. 9 may transmit the control information corresponding to the transmission in the control portion of the transmit section of the slot via the transceiver 921.

At block 1310, the V2X device may transmit V2X data corresponding to the transmission within a data portion of the transmit section of the slot. The transmission may occupy the contiguous number of sub-channels beginning with the starting sub-channel. As an example, the V2X data may be transmitted within a physical sidelink shared channel. For example, the communication and processing circuitry 941 shown and described above in connection with FIG. 9 may transmit the V2X data corresponding to the transmission in the data portion of the transmit section of the slot via the transceiver 921.

Figure 14:
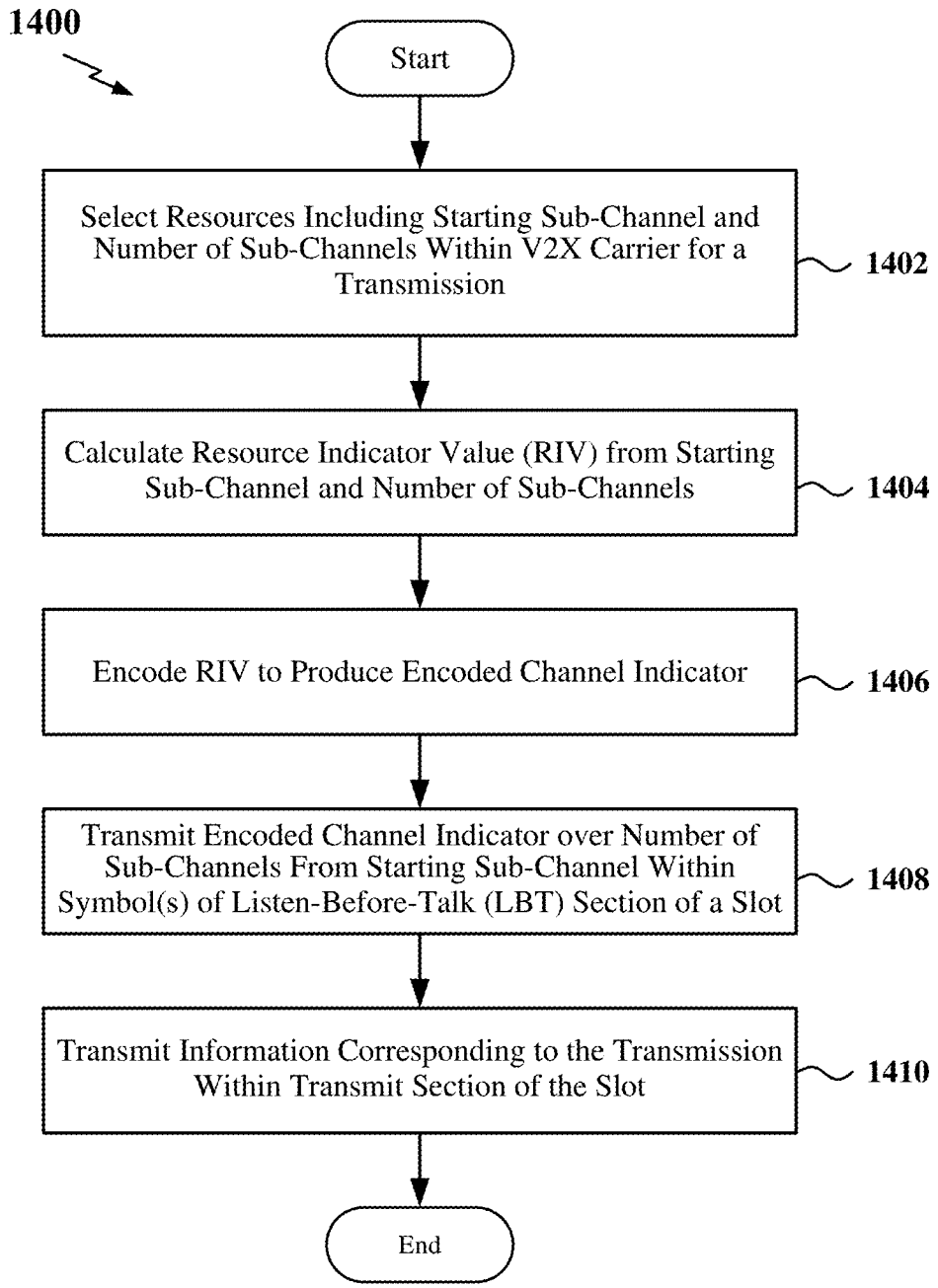

FIG. 14 is a flow chart 1400 of a method for wireless communication over a V2X carrier. As described below, some or all illustrated features may be omitted in a particular implementation within the scope of the present disclosure, and some illustrated features may not be required for implementation of all embodiments. In some examples, the method may be performed by the V2X device 900, as described above and illustrated in FIG. 9, by a processor or processing system, or by any suitable means for carrying out the described functions.

At block 1402, the V2X device may select resources including a starting sub-channel and a set (number) of contiguous sub-channels within the V2X carrier for a transmission. In some examples, the V2X device may select the resources based on the amount and/or type of V2X data to transmit and LBT. For example, the communication and processing circuitry 941 shown and described above in connection with FIG. 9 may select resources for a transmission over a set of contiguous sub-channels of a V2X carrier.

At block 1404, the V2X device may calculate a resource indicator value (RV) from the starting sub-channel and the set of contiguous sub-channels. For example, the RIV calculation circuitry 942 shown and described above in connection with FIG. 9 may calculate the RIV.

At block 1406, the V2X device may encode the RIV to produce an encoded channel indicator. For example, the RIV may be polar encoded to produce the encoded channel indicator. In some examples, the RIV may be interleaved with a demodulation reference signal (DMRS) prior to encoding. For example, the encoding/decoding circuitry 944 shown and described above in connection with FIG. 9 may encode the RIV to produce the encoded channel indicator.

At block 1408, the V2X device may transmit the encoded channel indicator over the set of contiguous sub-channels starting from the starting sub-channel (i.e., the starting sub-channel is the first sub-channel in the set of contiguous sub-channels) within at least one symbol of a listen-before-talk (LBT) section of a slot. In some examples, the V2X device may utilize a back-off timer during LBT, and may transmit the encoded channel indicator within the first symbol after expiration of the back-off timer. In some examples, the V2X device may repeat the transmission of the encoded channel indicator within each subsequent symbol (or half-symbol) of the LBT section of the slot. For example, the communication and processing circuitry 941 shown and described above in connection with FIG. 9 may transmit the encoded channel indicator via the transceiver 921.

At block 1410, the V2X device may transmit information corresponding to the transmission within a transmit section of the slot. The transmission may occupy the contiguous number of sub-channels beginning with the starting sub-channel. In some examples, the V2X device may transmit the V2X data within the transmit section of the slot. In other examples, the V2X device may transmit control information related to the V2X data within a control portion of the transmit section, and the V2X data within a data portion of the transmit section. As an example, the control information may be transmitted within a physical sidelink control channel, whereas the V2X data may be transmitted within a physical sidelink shared channel. For example, the communication and processing circuitry 941 shown and described above in connection with FIG. 9 may transmit the information corresponding to the transmission in the transmit section of the slot via the transceiver 921.

Figure 15:
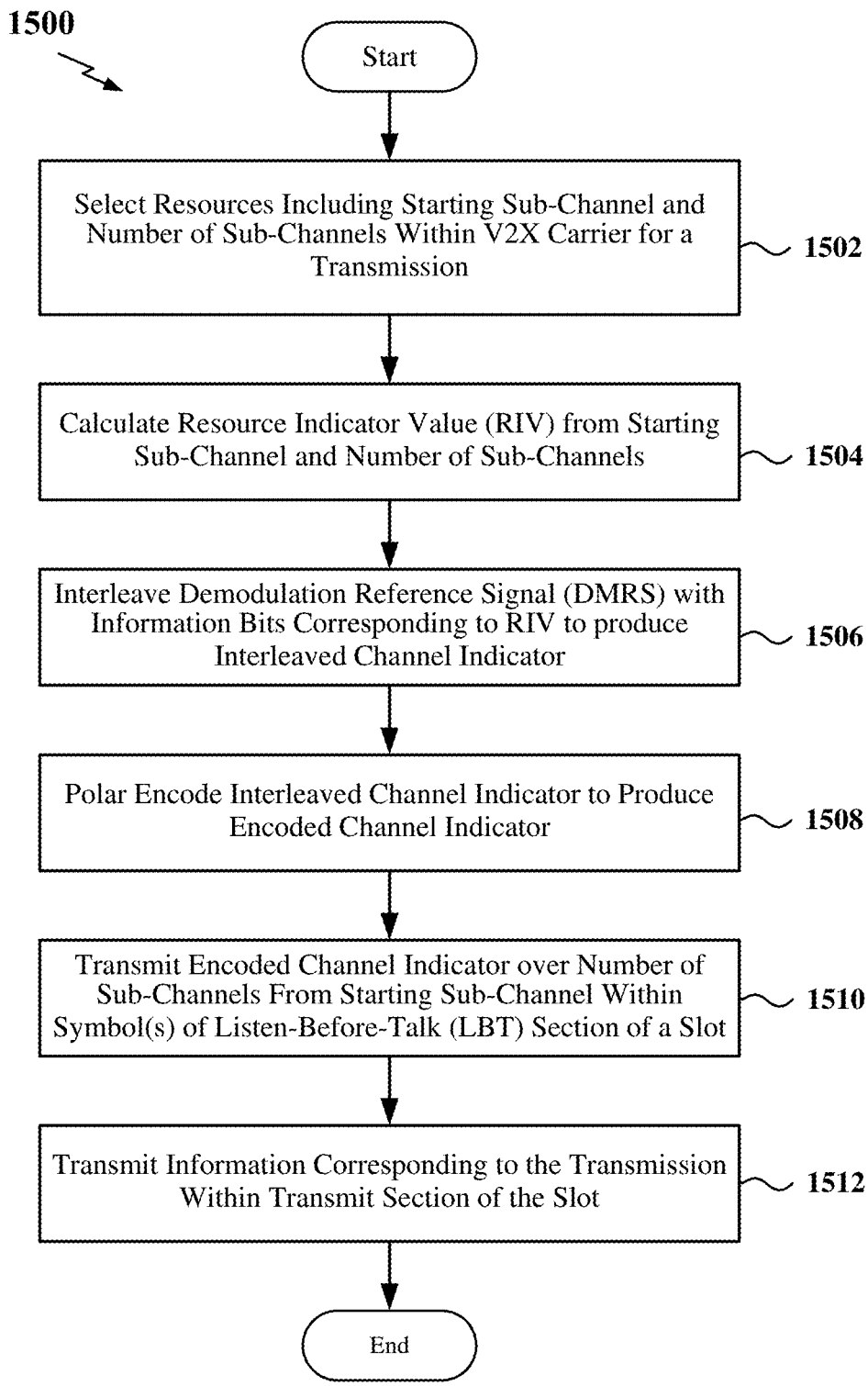

FIG. 15 is a flow chart 1500 of a method for wireless communication over a V2X carrier. As described below, some or all illustrated features may be omitted in a particular implementation within the scope of the present disclosure, and some illustrated features may not be required for implementation of all embodiments. In some examples, the method may be performed by the V2X device 900, as described above and illustrated in FIG. 9, by a processor or processing system, or by any suitable means for carrying out the described functions.

At block 1502, the V2X device may select resources including a starting sub-channel and a set (number) of contiguous sub-channels within the V2X carrier for a transmission. In some examples, the V2X device may select the resources based on the amount and/or type of V2X data to transmit and LBT. For example, the communication and processing circuitry 941 shown and described above in connection with FIG. 9 may select resources for a transmission over a set of contiguous sub-channels of a V2X carrier.

At block 1504, the V2X device may calculate a resource indicator value (RV) from the starting sub-channel and the set of contiguous sub-channels. For example, the RIV calculation circuitry 942 shown and described above in connection with FIG. 9 may calculate the RIV.

At block 1506, the V2X device may interleave a demodulation reference signal (DMRS) with information bits corresponding to the RIV to produce an interleaved channel indicator. For example, the interleaving circuitry 943 shown and described above in connection with FIG. 9 may interleave the DMRS with information bits corresponding to the RIV to produce the interleaved channel indicator.

At block 1508, the V2X device may encode the interleaved channel indicator to produce an encoded channel indicator. For example, the interleaved channel indicator may be polar encoded to produce the encoded channel indicator. For example, the encoding/decoding circuitry 944 shown and described above in connection with FIG. 9 may encode the interleaved channel indicator to produce the encoded channel indicator.

At block 1510, the V2X device may transmit the encoded channel indicator over the set of contiguous sub-channels starting from the starting sub-channel (i.e., the starting sub-channel is the first sub-channel in the set of contiguous sub-channels) within at least one symbol of a listen-before-talk (LBT) section of a slot. In some examples, the V2X device may utilize a back-off timer during LBT, and may transmit the encoded channel indicator within the first symbol after expiration of the back-off timer. In some examples, the V2X device may repeat the transmission of the encoded channel indicator within each subsequent symbol (or half-symbol) of the LBT section of the slot. For example, the communication and processing circuitry 941 shown and described above in connection with FIG. 9 may transmit the encoded channel indicator via the transceiver 921.

At block 1512, the V2X device may transmit information corresponding to the transmission within a transmit section of the slot. The transmission may occupy the contiguous number of sub-channels beginning with the starting sub-channel. In some examples, the V2X device may transmit the V2X data within the transmit section of the slot. In other examples, the V2X device may transmit control information related to the V2X data within a control portion of the transmit section, and the V2X data within a data portion of the transmit section. As an example, the control information may be transmitted within a physical sidelink control channel, whereas the V2X data may be transmitted within a physical sidelink shared channel. For example, the communication and processing circuitry 941 shown and described above in connection with FIG. 9 may transmit the information corresponding to the transmission in the transmit section of the slot via the transceiver 921.

Figure 16:
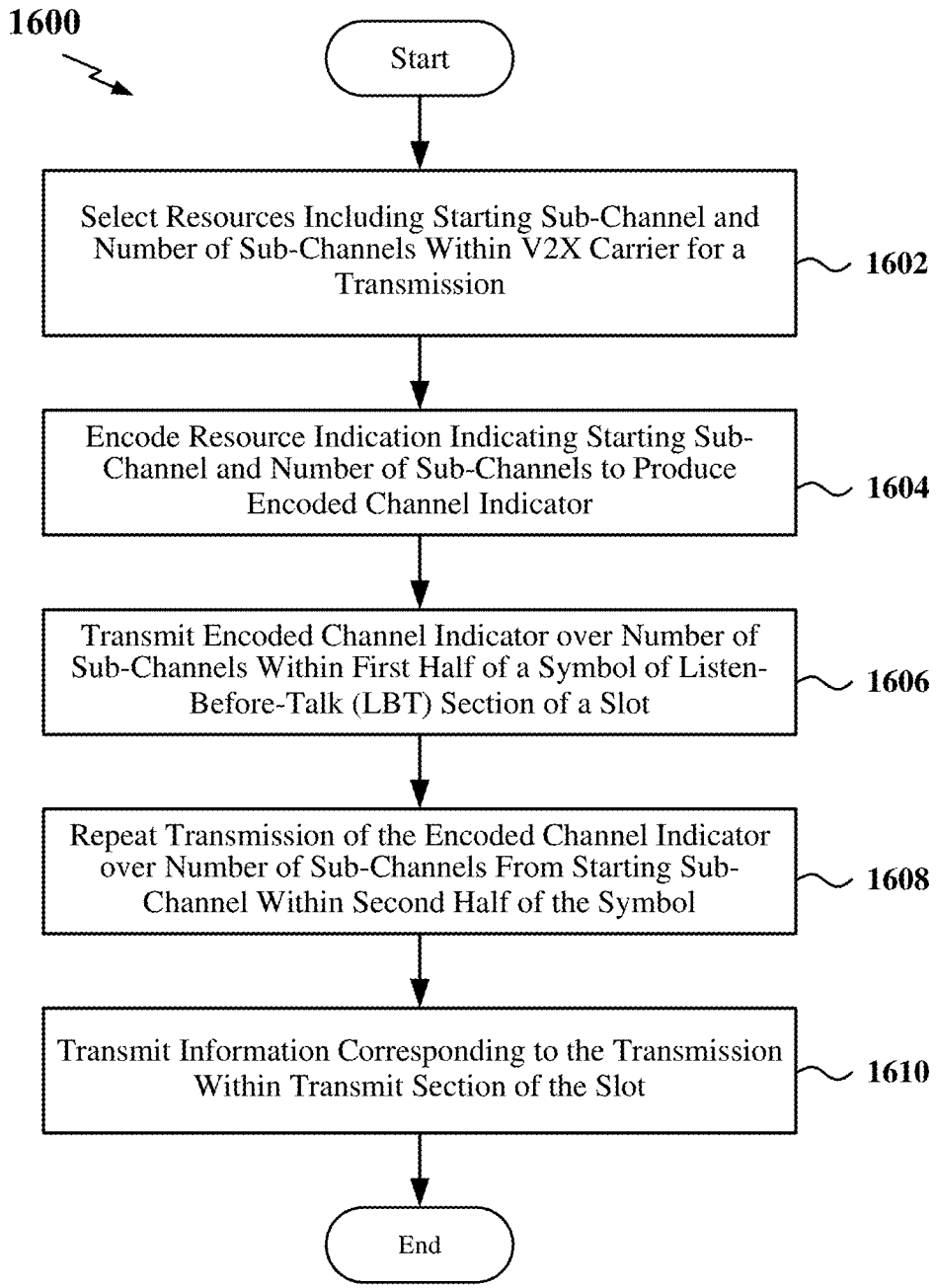

FIG. 16 is a flow chart 1600 of a method for wireless communication over a V2X carrier. As described below, some or all illustrated features may be omitted in a particular implementation within the scope of the present disclosure, and some illustrated features may not be required for implementation of all embodiments. In some examples, the method may be performed by the V2X device 900, as described above and illustrated in FIG. 9, by a processor or processing system, or by any suitable means for carrying out the described functions.

At block 1602, the V2X device may select resources including a starting sub-channel and a set (number) of contiguous sub-channels within the V2X carrier for a transmission. In some examples, the V2X device may select the resources based on the amount and/or type of V2X data to transmit and LBT. For example, the communication and processing circuitry 941 shown and described above in connection with FIG. 9 may select resources for a transmission over a set of contiguous sub-channels of a V2X carrier.

At block 1604, the V2X device may encode a resource indication indicating the starting sub-channel and the set of contiguous sub-channels selected for the transmission to produce an encoded channel indicator. In some examples, the V2X device may encode the starting sub-channel and set of contiguous sub-channels using polar coding. In some examples, a resource indicator value (RIV) may be calculated from the starting sub-channel and the set of contiguous sub-channels, and the RIV may be polar encoded. In some examples, the RIV may be interleaved with a demodulation reference signal (DMRS) prior to encoding. For example, the encoding/decoding circuitry 944 shown and described above in connection with FIG. 9 may encode the resource indication indicating the starting sub-channel and number of contiguous channels to produce the encoded channel indicator.

At block 1606, the V2X device may transmit the encoded channel indicator over the set of contiguous sub-channels starting from the starting sub-channel (i.e., the starting sub-channel is the first sub-channel in the set of contiguous sub-channels) within a first half of a symbol of a listen-before-talk (LBT) section of a slot. In some examples, the V2X device may utilize a back-off timer during LBT, and may transmit the encoded channel indicator within the first half of the first symbol after expiration of the back-off timer. For example, the communication and processing circuitry 941 shown and described above in connection with FIG. 9 may transmit the encoded channel indicator via the transceiver 921.

At block 1608, the V2X device may repeat transmission of the encoded channel indicator over the set of contiguous sub-channels starting from the starting sub-channel within a second half of the same symbol of the LBT section of the slot. For example, the communication and processing circuitry 941 shown and described above in connection with FIG. 9 may transmit the encoded channel indicator via the transceiver 921.

At block 1610, the V2X device may transmit information corresponding to the transmission within a transmit section of the slot. The transmission may occupy the contiguous number of sub-channels beginning with the starting sub-channel. In some examples, the V2X device may transmit the V2X data within the transmit section of the slot. In other examples, the V2X device may transmit control information related to the V2X data within a control portion of the transmit section, and the V2X data within a data portion of the transmit section. As an example, the control information may be transmitted within a physical sidelink control channel, whereas the V2X data may be transmitted within a physical sidelink shared channel. For example, the communication and processing circuitry 941 shown and described above in connection with FIG. 9 may transmit the information corresponding to the transmission in the transmit section of the slot via the transceiver 921.

Figure 17:
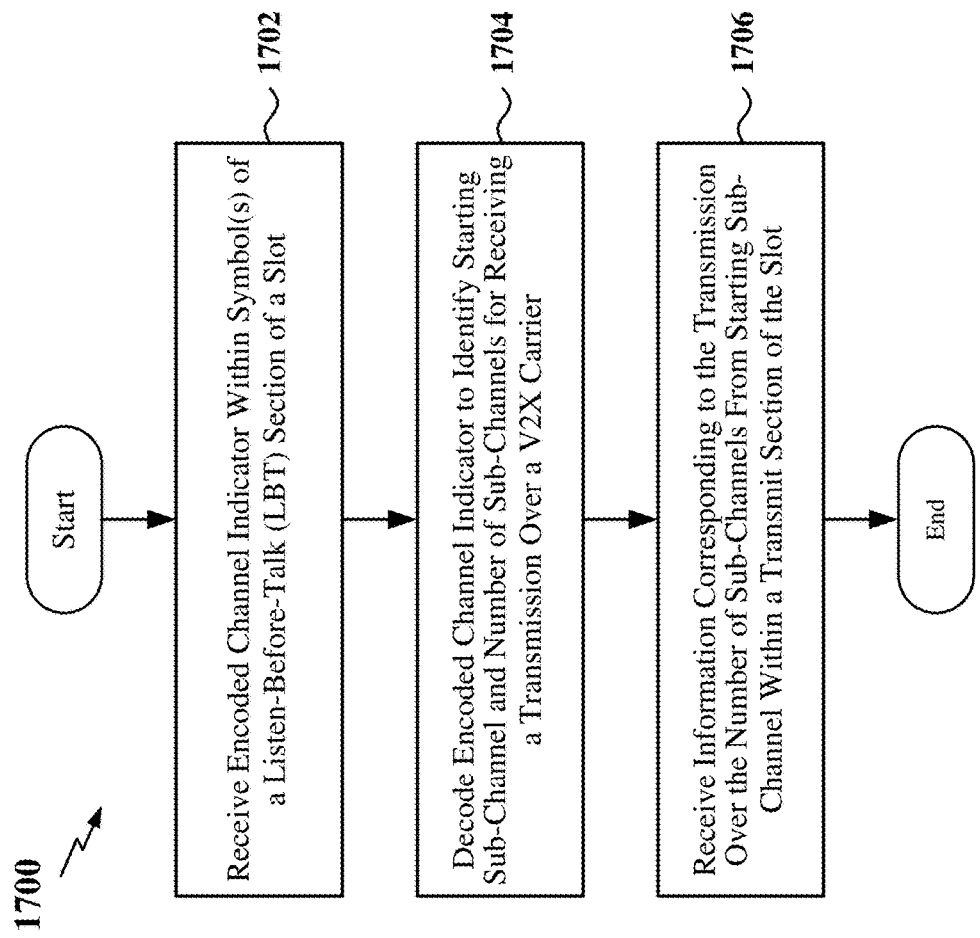

FIG. 17 is a flow chart 1700 of a method for wireless communication over a V2X carrier. As described below, some or all illustrated features may be omitted in a particular implementation within the scope of the present disclosure, and some illustrated features may not be required for implementation of all embodiments. In some examples, the method may be performed by the V2X device 900, as described above and illustrated in FIG. 9, by a processor or processing system, or by any suitable means for carrying out the described functions.

At block 1702, the V2X device may receive an encoded channel indicator within at least one symbol of a LBT section of a slot. In some examples, the V2X device may receive the encoded channel indicator over a set of contiguous sub-channels beginning at a starting sub-channel within a symbol or half-symbol of the LBT section of the slot, and may then receive repeated transmissions of the encoded channel indicator within each subsequent symbol or half-symbol of the LBT section of the slot. In some examples, the V2X device may also receive a PDCCH prior to the LBT section of the slot. For example, the communication and processing circuitry 941 shown and described above in connection with FIG. 9 may receive the encoded channel indicator via the transceiver 921.

At block 1704, the V2X device may decode the encoded channel indicator to identify a starting sub-channel and a set (number) of contiguous sub-channels for receiving a subsequent transmission of V2X data over the V2X carrier within a transmit section of the slot. In some examples, the encoded channel indicator may be polar encoded, and therefore, the V2X device may polar decode the encoded channel indicator. In some examples, the polar encoded channel indicator includes a polar encoded RIV calculated from the starting sub-channel and the set of contiguous sub-channels. In some examples, the polar encoded channel indicator may include a polar coded interleaved channel indicator that includes information bits of the RIV interleaved with a downlink modulation reference signal (DMRS). For example, the encoding/decoding circuitry 944 shown and described above in connection with FIG. 9 may decode the encoded channel indicator.

At block 1706, the V2X device may receive information corresponding to the transmission over the set of contiguous sub-channels starting from the starting sub-channel (i.e., the starting sub-channel is the first sub-channel in the set of contiguous sub-channels) within a transmit section of the slot. In some examples, the V2X device may receive V2X data within the transmit section of the slot. In other examples, the V2X device may receive control information related to the V2X data within a control portion of the transmit section, and the V2X data within a data portion of the transmit section. As an example, the control information may be received within a physical sidelink control channel, whereas the V2X data may be received within a physical sidelink shared channel. For example, the communication and processing circuitry 941 shown and described above in connection with FIG. 9 may receive the information corresponding to the transmission in the transmit section of the slot via the transceiver 921.

Figure 18:
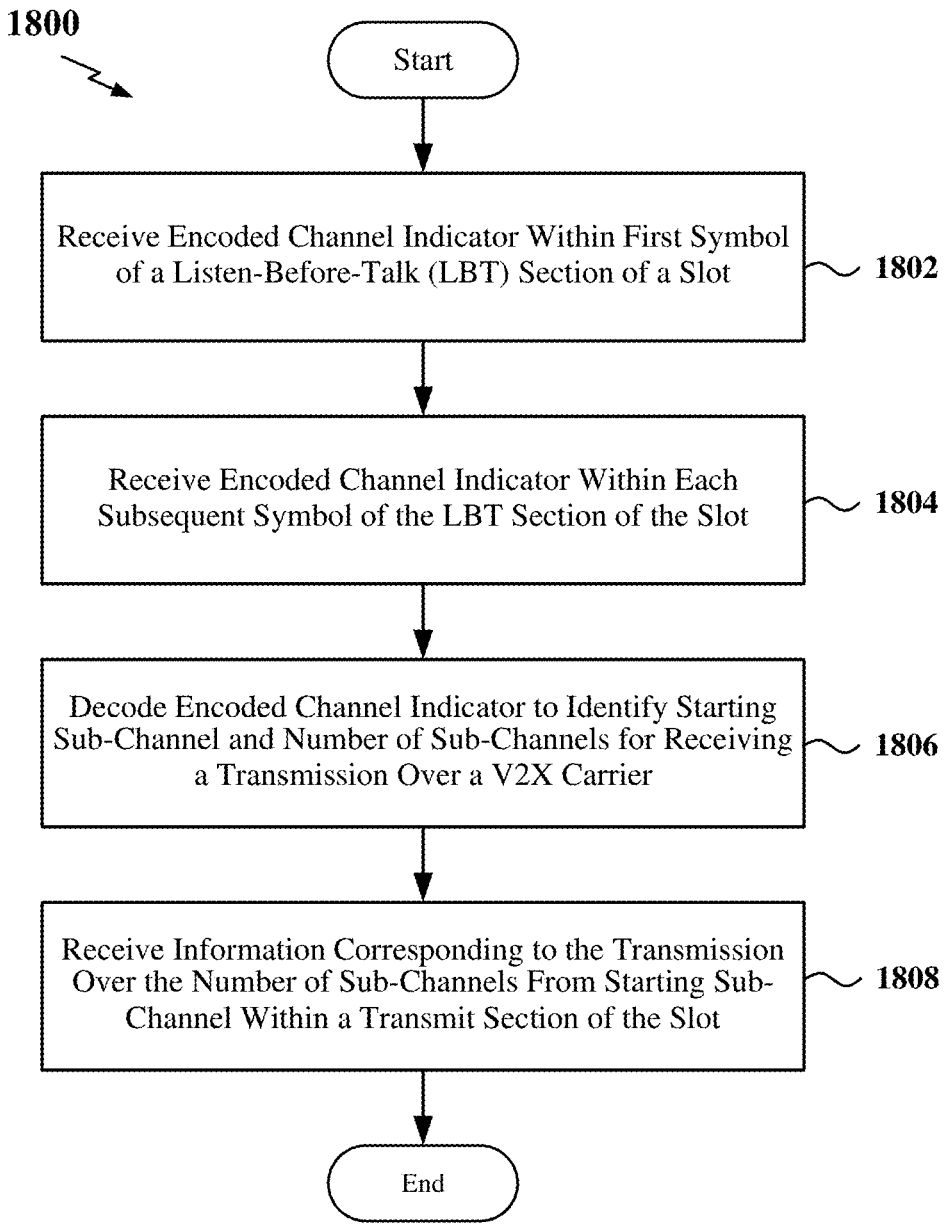

FIG. 18 is a flow chart 1800 of a method for wireless communication over a V2X carrier. As described below, some or all illustrated features may be omitted in a particular implementation within the scope of the present disclosure, and some illustrated features may not be required for implementation of all embodiments. In some examples, the method may be performed by the V2X device 900, as described above and illustrated in FIG. 9, by a processor or processing system, or by any suitable means for carrying out the described functions.

At block 1802, the V2X device may receive an encoded channel indicator within a first symbol of a LBT section of a slot. The first symbol may be the first symbol after expiration of a back-off timer at the transmitting V2X device or the actual first symbol (in units of time) within the LBT section of the slot. In some examples, the V2X device may receive the encoded channel indicator over a set of contiguous sub-channels beginning at a starting sub-channel within the first symbol of the LBT section of the slot. In some examples, the V2X device may also receive a PDCCH prior to the LBT section of the slot. For example, the communication and processing circuitry 941 shown and described above in connection with FIG. 9 may receive the encoded channel indicator via the transceiver 921.

At block 1804, the V2X device may receive the encoded channel indicator within each subsequent symbol of the LBT section of the slot. The repeated encoded channel indicators may also be received over the set of contiguous sub-channels beginning at the starting sub-channel. For example, the communication and processing circuitry 941 shown and described above in connection with FIG. 9 may receive the encoded channel indicator via the transceiver 921.

At block 1806, the V2X device may decode the encoded channel indicator (based on the repeated receptions thereof) to identify a starting sub-channel and a set (number) of contiguous sub-channels for receiving a subsequent transmission of V2X data over the V2X carrier within a transmit section of the slot. In some examples, the encoded channel indicator may be polar encoded, and therefore, the V2X device may polar decode the encoded channel indicator. In some examples, the polar encoded channel indicator includes a polar encoded RIV calculated from the starting sub-channel and the set of contiguous sub-channels. In some examples, the polar encoded channel indicator may include a polar encoded interleaved channel indicator that includes information bits of the RIV interleaved with a downlink modulation reference signal (DMRS). For example, the encoding/decoding circuitry 944 shown and described above in connection with FIG. 9 may decode the encoded channel indicator.

At block 1808, the V2X device may receive information corresponding to the transmission over the set of contiguous sub-channels starting from the starting sub-channel (i.e., the starting sub-channel is the first sub-channel in the set of contiguous sub-channels) within a transmit section of the slot. In some examples, the V2X device may receive V2X data within the transmit section of the slot. In other examples, the V2X device may receive control information related to the V2X data within a control portion of the transmit section, and the V2X data within a data portion of the transmit section. As an example, the control information may be received within a physical sidelink control channel, whereas the V2X data may be received within a physical sidelink shared channel. For example, the communication and processing circuitry 941 shown and described above in connection with FIG. 9 may receive the information corresponding to the transmission in the transmit section of the slot via the transceiver 921.

Figure 19:
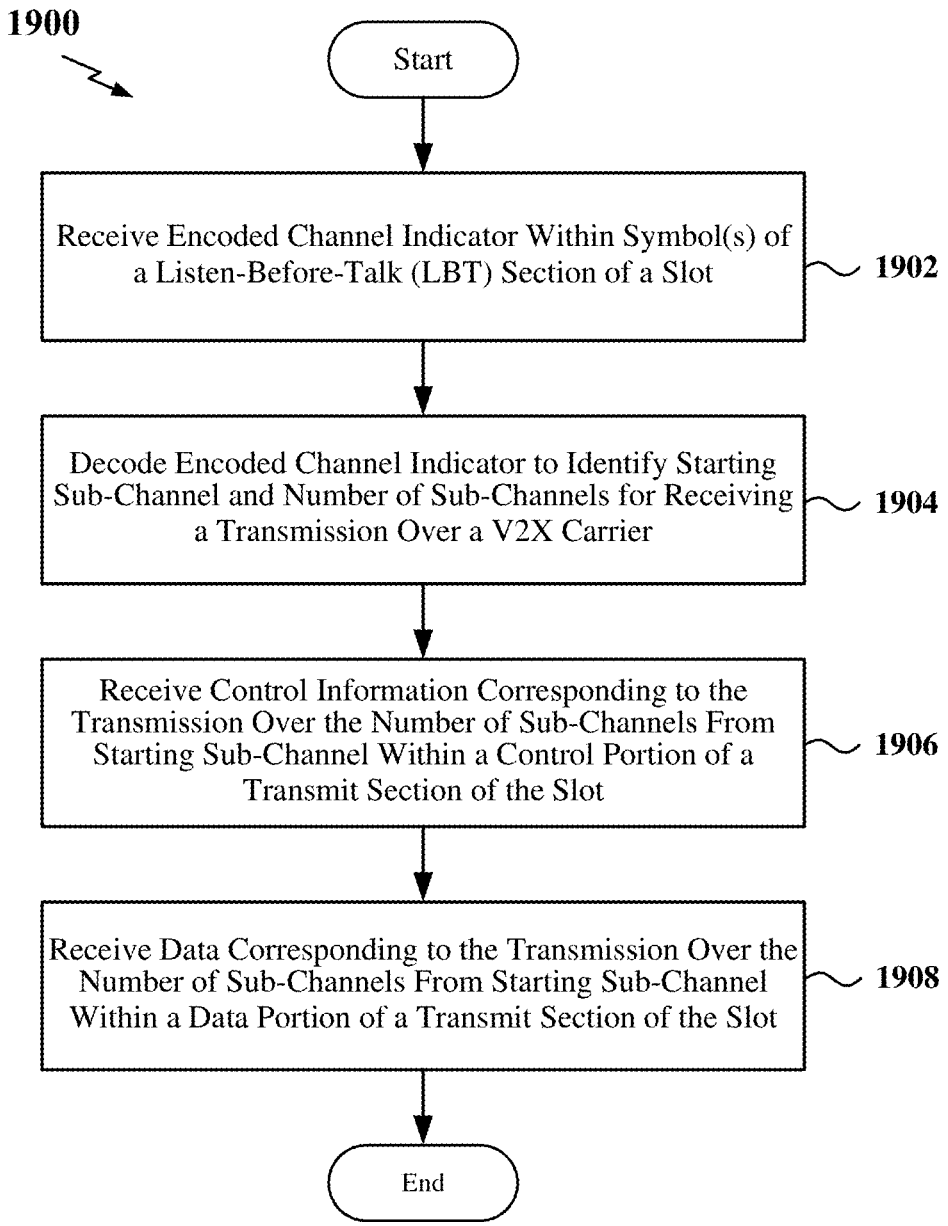

FIG. 19 is a flow chart 1900 of a method for wireless communication over a V2X carrier. As described below, some or all illustrated features may be omitted in a particular implementation within the scope of the present disclosure, and some illustrated features may not be required for implementation of all embodiments. In some examples, the method may be performed by the V2X device 900, as described above and illustrated in FIG. 9, by a processor or processing system, or by any suitable means for carrying out the described functions.

At block 1902, the V2X device may receive an encoded channel indicator within at least one symbol of a LBT section of a slot. In some examples, the V2X device may receive the encoded channel indicator over a set of contiguous sub-channels beginning at a starting sub-channel within a symbol or half-symbol of the LBT section of the slot, and may then receive repeated transmissions of the encoded channel indicator within each subsequent symbol or half-symbol of the LBT section of the slot. In some examples, the V2X device may also receive a PDCCH prior to the LBT section of the slot. For example, the communication and processing circuitry 941 shown and described above in connection with FIG. 9 may receive the encoded channel indicator via the transceiver 921.

At block 1904, the V2X device may decode the encoded channel indicator to identify a starting sub-channel and a set (number) of contiguous sub-channels for receiving a subsequent transmission of V2X data over the V2X carrier within a transmit section of the slot. In some examples, the encoded channel indicator may be polar encoded, and therefore, the V2X device may polar decode the encoded channel indicator. In some examples, the polar encoded channel indicator includes a polar encoded RIV calculated from the starting sub-channel and the set of contiguous sub-channels. In some examples, the polar encoded channel indicator may include a polar coded interleaved channel indicator that includes information bits of the RIV interleaved with a downlink modulation reference signal (DMRS). For example, the encoding/decoding circuitry 944 shown and described above in connection with FIG. 9 may decode the encoded channel indicator.

At block 1906, the V2X device may receive control information corresponding to the transmission over the set of contiguous sub-channels (i.e., the starting sub-channel is the first sub-channel in the set of contiguous sub-channels) within a control portion of a transmit section of the slot. As an example, the control information may be received within a physical sidelink control channel. For example, the communication and processing circuitry 941 shown and described above in connection with FIG. 9 may receive the control information corresponding to the transmission in the transmit section of the slot via the transceiver 921.

At block 1908, the V2X device may receive V2X data corresponding to the transmission over the set of contiguous sub-channels starting from the starting sub-channel (i.e., the starting sub-channel is the first sub-channel in the set of contiguous sub-channels) within a data portion of the transmit section of the slot. As an example, the V2X data may be received within a physical sidelink shared channel. For example, the communication and processing circuitry 941 shown and described above in connection with FIG. 9 may receive the V2X data corresponding to the transmission in the transmit section of the slot via the transceiver 921.

Figure 20:
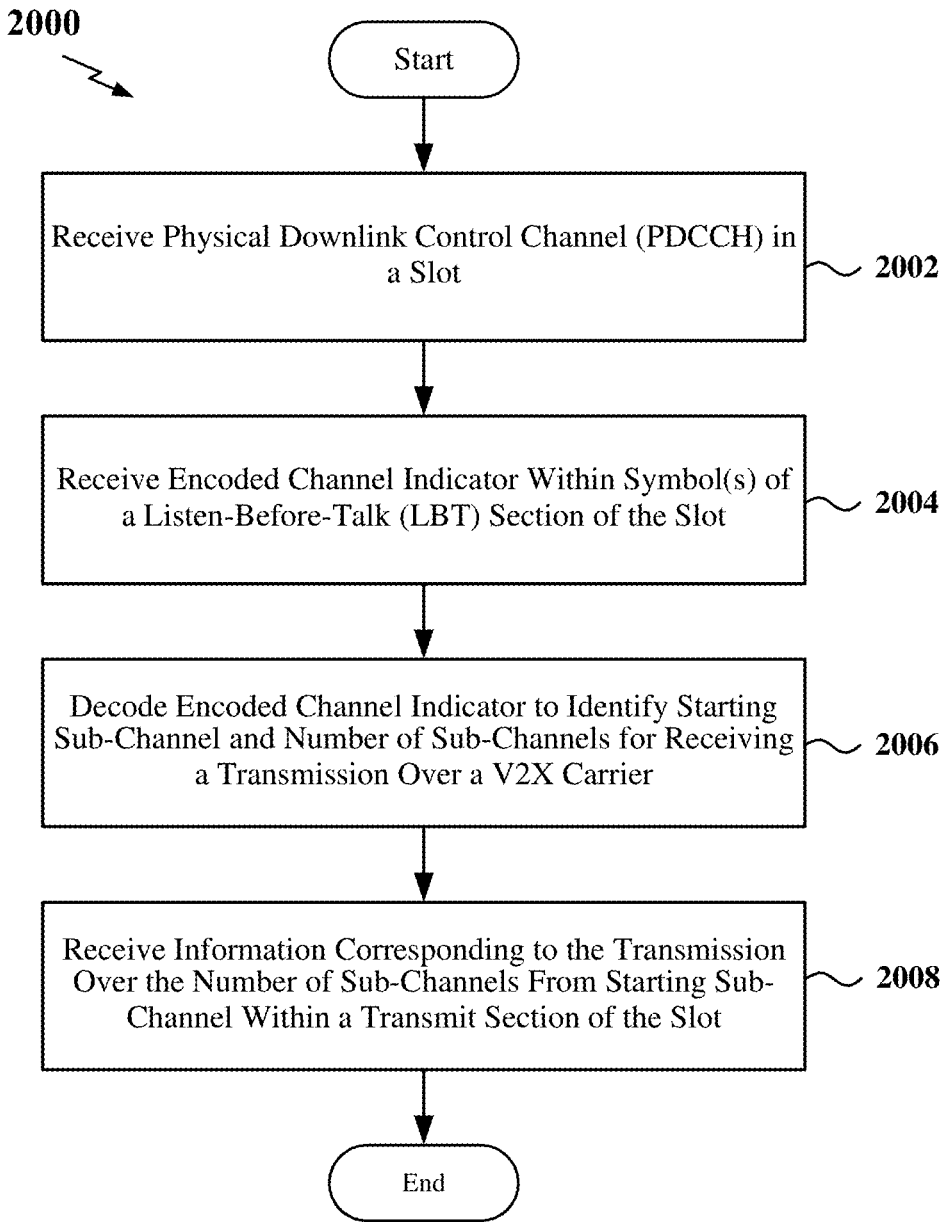

FIG. 20 is a flow chart 2000 of a method for wireless communication over a V2X carrier. As described below, some or all illustrated features may be omitted in a particular implementation within the scope of the present disclosure, and some illustrated features may not be required for implementation of all embodiments. In some examples, the method may be performed by the V2X device 900, as described above and illustrated in FIG. 9, by a processor or processing system, or by any suitable means for carrying out the described functions.

At block 2002, the V2X device may receive a physical downlink control channel (PDCCH) within a slot. The PDCCH may be received at a beginning of the slot (i.e., the PDCCH may be received within a first symbol corresponding to the start of the slot). For example, the communication and processing circuitry 941 shown and described above in connection with FIG. 9 may receive the PDCCH.

At block 2004, the V2X device may receive an encoded channel indicator within at least one symbol of a LBT section of a slot. The at least one symbol of the LBT section of the slot may include symbol(s) that are received subsequent in time to the PDCCH. In some examples, the V2X device may receive the encoded channel indicator over a set of contiguous sub-channels beginning at a starting sub-channel within a symbol or half-symbol of the LBT section of the slot, and may then receive repeated transmissions of the encoded channel indicator within each subsequent symbol or half-symbol of the LBT section of the slot. For example, the communication and processing circuitry 941 shown and described above in connection with FIG. 9 may receive the encoded channel indicator via the transceiver 921.

At block 2006, the V2X device may decode the encoded channel indicator to identify a starting sub-channel and a set (number) of contiguous sub-channels for receiving a subsequent transmission of V2X data over the V2X carrier within a transmit section of the slot. In some examples, the encoded channel indicator may be polar encoded, and therefore, the V2X device may polar decode the encoded channel indicator. In some examples, the polar encoded channel indicator includes a polar encoded RIV calculated from the starting sub-channel and the set of contiguous sub-channels. In some examples, the polar encoded channel indicator may include a polar coded interleaved channel indicator that includes information bits of the RIV interleaved with a downlink modulation reference signal (DMRS). For example, the encoding/decoding circuitry 944 shown and described above in connection with FIG. 9 may decode the encoded channel indicator.

At block 2008, the V2X device may receive information corresponding to the transmission over the set of contiguous sub-channels starting from the starting sub-channel (i.e., the starting sub-channel is the first sub-channel in the set of contiguous sub-channels) within a transmit section of the slot. In some examples, the V2X device may receive V2X data within the transmit section of the slot. In other examples, the V2X device may receive control information related to the V2X data within a control portion of the transmit section, and the V2X data within a data portion of the transmit section. As an example, the control information may be received within a physical sidelink control channel, whereas the V2X data may be received within a physical sidelink shared channel. For example, the communication and processing circuitry 941 shown and described above in connection with FIG. 9 may receive the information corresponding to the transmission in the transmit section of the slot via the transceiver 921.

Figure 21:
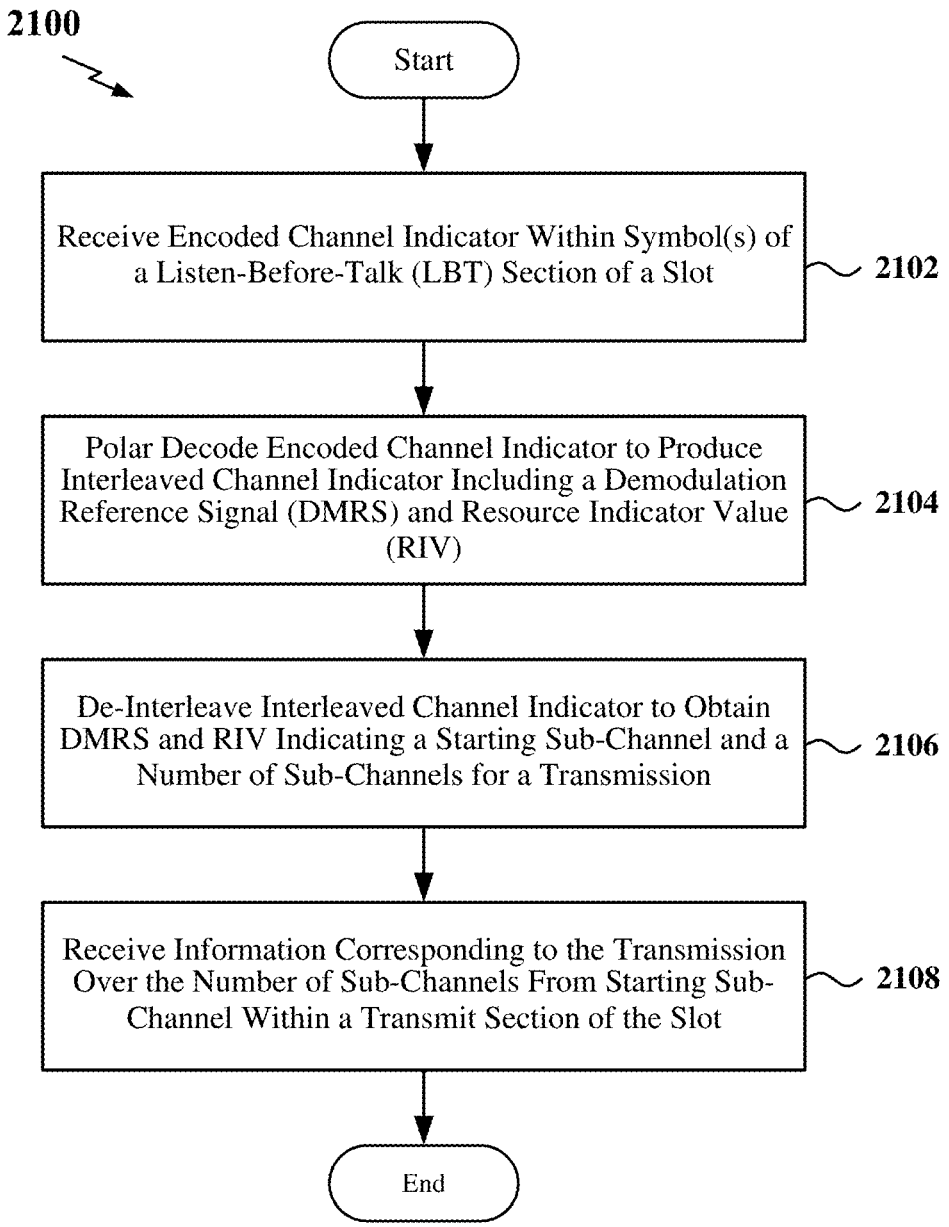

FIG. 21 is a flow chart 2100 of a method for wireless communication over a V2X carrier. As described below, some or all illustrated features may be omitted in a particular implementation within the scope of the present disclosure, and some illustrated features may not be required for implementation of all embodiments. In some examples, the method may be performed by the V2X device 900, as described above and illustrated in FIG. 9, by a processor or processing system, or by any suitable means for carrying out the described functions.

At block 2102, the V2X device may receive an encoded channel indicator within at least one symbol of a LBT section of a slot. In some examples, the V2X device may receive the encoded channel indicator over a set of contiguous sub-channels beginning at a starting sub-channel within a symbol or half-symbol of the LBT section of the slot, and may then receive repeated transmissions of the encoded channel indicator within each subsequent symbol or half-symbol of the LBT section of the slot. In some examples, the V2X device may also receive a PDCCH prior to the LBT section of the slot. For example, the communication and processing circuitry 941 shown and described above in connection with FIG. 9 may receive the encoded channel indicator via the transceiver 921.

At block 2104, the V2X device may polar decode the encoded channel indicator to produce an interleaved channel indicator including a demodulation reference signal (DMRS) interleaved with information bits of a resource indicator value (RIV). The RIV may be calculated from a starting sub-channel and a set (number) of contiguous sub-channels for receiving a subsequent transmission of V2X data over the V2X carrier within a transmit section of the slot. For example, the encoding/decoding circuitry 944 shown and described above in connection with FIG. 9 may decode the encoded channel indicator.

At block 2106, the V2X device may de-interleave the interleaved channel indicator to obtain the DMRS and the RIV indicating the starting sub-channel and the number of sub-channels for the subsequent transmission. For example, the interleaving circuitry 943 shown and described above in connection with FIG. 9 may de-interleave the interleaved channel indicator.

At block 2108, the V2X device may receive information corresponding to the transmission over the set of contiguous sub-channels starting from the starting sub-channel (i.e., the starting sub-channel is the first sub-channel in the set of contiguous sub-channels) within a transmit section of the slot. In some examples, the V2X device may receive V2X data within the transmit section of the slot. In other examples, the V2X device may receive control information related to the V2X data within a control portion of the transmit section, and the V2X data within a data portion of the transmit section. As an example, the control information may be received within a physical sidelink control channel, whereas the V2X data may be received within a physical sidelink shared channel. For example, the communication and processing circuitry 941 shown and described above in connection with FIG. 9 may receive the information corresponding to the transmission in the transmit section of the slot via the transceiver 921.

Figure 22:
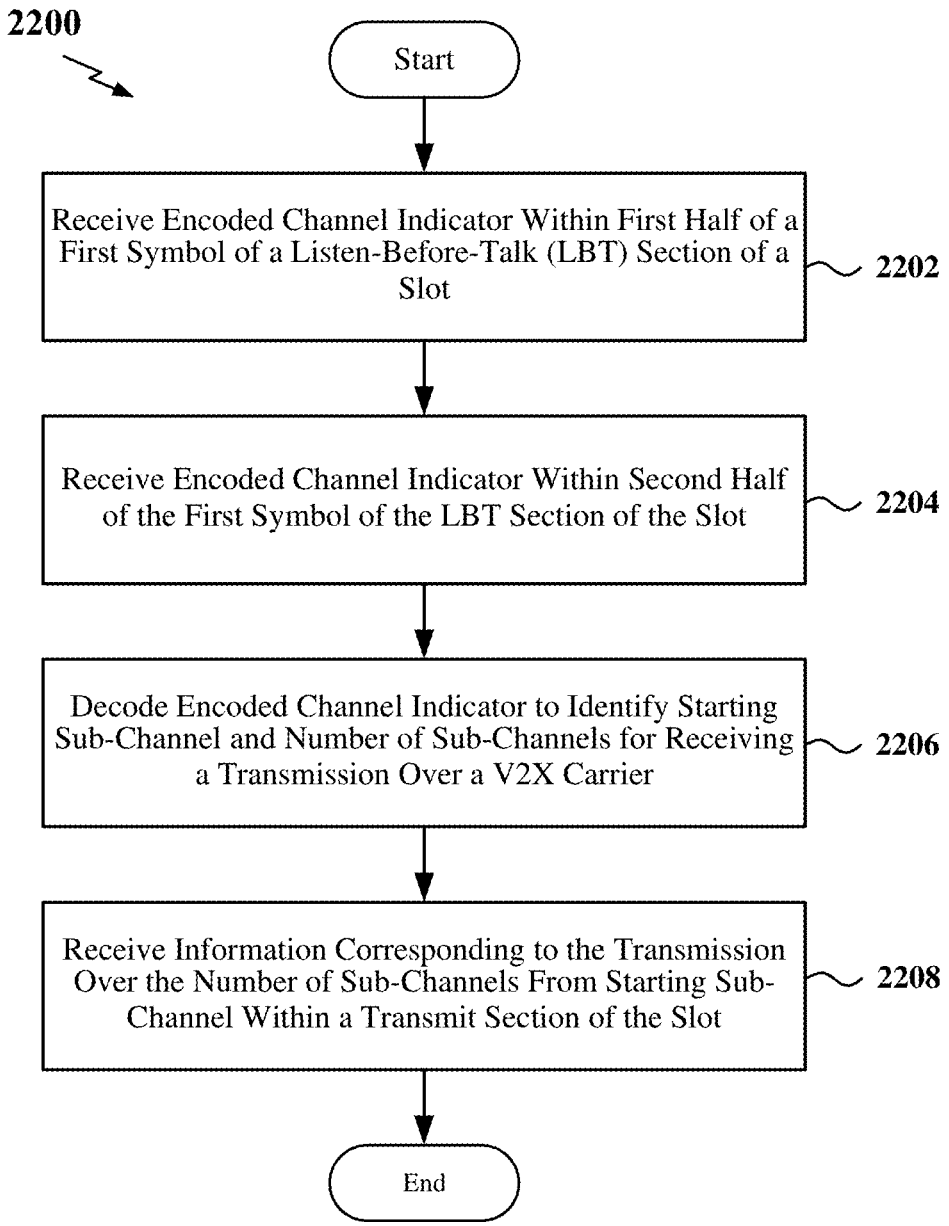

FIG. 22 is a flow chart 2200 of a method for wireless communication over a V2X carrier. As described below, some or all illustrated features may be omitted in a particular implementation within the scope of the present disclosure, and some illustrated features may not be required for implementation of all embodiments. In some examples, the method may be performed by the V2X device 900, as described above and illustrated in FIG. 9, by a processor or processing system, or by any suitable means for carrying out the described functions.

At block 2202, the V2X device may receive an encoded channel indicator within a first half of a first symbol of a LBT section of a slot. The first symbol may be the first symbol after expiration of a back-off timer at the transmitting V2X device or the actual first symbol (in units of time) within the LBT section of the slot. In some examples, the V2X device may receive the encoded channel indicator over a set (number) of contiguous sub-channels beginning at a starting sub-channel within the first half of the first symbol of the LBT section of the slot. In some examples, the V2X device may also receive a PDCCH prior to the LBT section of the slot. For example, the communication and processing circuitry 941 shown and described above in connection with FIG. 9 may receive the encoded channel indicator via the transceiver 921.

At block 2204, the V2X device may receive the encoded channel indicator within a second half of the first symbol of the LBT section of the slot. The repeated encoded channel indicator may also be received over the set of contiguous sub-channels beginning at the starting sub-channel. For example, the communication and processing circuitry 941 shown and described above in connection with FIG. 9 may receive the encoded channel indicator via the transceiver 921.

At block 2206, the V2X device may decode the encoded channel indicator (based on the repeated receptions thereof) to identify a starting sub-channel and a set of contiguous sub-channels for receiving a subsequent transmission of V2X data over the V2X carrier within a transmit section of the slot. In some examples, the encoded channel indicator may be polar encoded, and therefore, the V2X device may polar decode the encoded channel indicator. In some examples, the polar encoded channel indicator includes a polar encoded RIV calculated from the starting sub-channel and the set of contiguous sub-channels. In some examples, the polar encoded channel indicator may include a polar encoded interleaved channel indicator that includes information bits of the RIV interleaved with a downlink modulation reference signal (DMRS). For example, the encoding/decoding circuitry 944 shown and described above in connection with FIG. 9 may decode the encoded channel indicator.

At block 2208, the V2X device may receive information corresponding to the transmission over the set of contiguous sub-channels starting from the starting sub-channel (i.e., the starting sub-channel is the first sub-channel in the set of contiguous sub-channels) within a transmit section of the slot. In some examples, the V2X device may receive V2X data within the transmit section of the slot. In other examples, the V2X device may receive control information related to the V2X data within a control portion of the transmit section, and the V2X data within a data portion of the transmit section. As an example, the control information may be received within a physical sidelink control channel, whereas the V2X data may be received within a physical sidelink shared channel. For example, the communication and processing circuitry 941 shown and described above in connection with FIG. 9 may receive the information corresponding to the transmission in the transmit section of the slot via the transceiver 921.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-22 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 8, and/or 9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication over a vehicle-to-everything (V2X) carrier, the V2X carrier comprising spectrum that is time-divided into a plurality of slots and frequency-divided into a plurality of sub-channels, the method comprising, at a V2X device:
   selecting resources comprising a starting sub-channel and a set of contiguous sub-channels of the plurality of sub-channels for a transmission, each of the plurality of sub-channels comprising a set of contiguous subcarriers;
   determining, based on the selected resources, a resource indication indicative of the starting sub-channel and the set of contiguous sub-channels for the transmission;
   encoding the resource indication to produce an encoded channel indicator;
   transmitting the encoded channel indicator over the set of contiguous sub-channels starting from the starting sub-channel within at least one symbol of a listen-before-talk (LBT) section of a slot of the plurality of slots, including transmitting the encoded channel indicator at least twice within a first symbol of the at least one symbol; and
   transmitting information corresponding to the transmission within a transmit section of the slot.

2. The method of claim 1, wherein selecting the resources comprising the starting sub-channel and the set of contiguous sub-channels further comprises:
   listening to the V2X carrier;
   initializing a back-off timer when at least the set of contiguous sub-channels within the V2X carrier are idle; and
   upon expiration of the back-off timer, selecting the resources comprising the starting sub-channel and the set of contiguous sub-channels of the plurality of sub-channels for the transmission when the set of contiguous sub-channels within the V2X carrier remain idle.

3. The method of claim 1, wherein transmitting information corresponding to the transmission within the transmit section of the slot further comprises:
   transmitting control information within a control portion of the transmit section of the slot; and
   transmitting data within a data portion of the transmit section of the slot.

4. The method of claim 3, wherein transmitting the control information within the control portion of the transmit section of the slot further comprises:
   transmitting the control information within a physical sidelink control channel.

5. The method of claim 3, wherein transmitting the data within the data portion of the transmit section of the slot further comprises:
   transmitting the data within a physical sidelink shared channel.

6. The method of claim 1, wherein transmitting the encoded channel indicator at least twice within a first symbol of the at least one symbol comprises:
   transmitting the encoded channel indicator at least once within a first half of the first symbol, and at least once within the second half of the first symbol of the at least one symbol.

7. A method for wireless communication over a vehicle-to-everything (V2X) carrier, the V2X carrier comprising spectrum that is time-divided into a plurality of slots and frequency-divided into a plurality of sub-channels, the method comprising, at a V2X device:
   selecting resources comprising a starting sub-channel and a set of contiguous sub-channels of the plurality of sub-channels for a transmission, each of the plurality of sub-channels comprising a set of contiguous subcarriers;
   calculating a resource indicator value (RIV) from the starting sub-channel and the set of contiguous sub-channels for the transmission;
   polar encoding the RIV to produce the encoded channel indicator;
   transmitting the encoded channel indicator over the set of contiguous sub-channels starting from the starting sub-channel within at least one symbol of a listen-before-talk (LBT) section of a slot of the plurality of slots; and
   transmitting information corresponding to the transmission within a transmit section of the slot.

8. The method of claim 7, further comprising, at the V2X device:
   interleaving a downlink modulation reference signal (DMRS) with information bits corresponding to the RIV.

9. The method of claim 8, wherein polar encoding the RIV to produce the encoded channel indicator further comprises:
   polar encoding the RIV interleaved with the DMRS.

10. A vehicle-to-everything (V2X) device, comprising:
    a processor;
    a wireless transceiver communicatively coupled to the processor and configured to communicate over a V2X carrier comprising spectrum that is time-divided into a plurality of slots and frequency-divided into a plurality of sub-channels, each of the plurality of sub-channels comprising a set of contiguous subcarriers; and
    a memory communicatively coupled to the processor, wherein the processor is configured to:
    select resources comprising a starting sub-channel and a set of contiguous sub-channels of the plurality of sub-channels for a transmission;
    determine, based on the selected resources, a resource indication indicative of the starting sub-channel and the set of contiguous sub-channels for the transmission;

encode the resource indication to produce an encoded channel indicator;

transmit the encoded channel indicator over the set of contiguous sub-channels starting from the starting sub-channel within at least one symbol of a listen-before-talk (LBT) section of a slot of the plurality of slots via the wireless transceiver, including transmission of the encoded channel indicator at least twice within a first symbol of the at least one symbol; and transmit information corresponding to the transmission within a transmit section of the slot via the wireless transceiver.

11. The V2X device of claim 10, wherein the processor is further configured to:

listen to the V2X carrier;

initialize a back-off timer when at least the set of contiguous sub-channels within the V2X carrier are idle; and upon expiration of the back-off timer, select the resources comprising the starting sub-channel and the set of contiguous sub-channels of the plurality of sub-channels for the transmission when the set of contiguous sub-channels within the V2X carrier remain idle.

12. The V2X device of claim 10, wherein the processor is further configured to:

transmit the encoded channel indicator at least once within a first half of the first symbol, and at least once within the second half of the first symbol of the at least one symbol.

13. A vehicle-to-everything (V2X) device, comprising:

a processor;

a wireless transceiver communicatively coupled to the processor and configured to communicate over a V2X carrier comprising spectrum that is time-divided into a plurality of slots and frequency-divided into a plurality of sub-channels, each of the plurality of sub-channels comprising a set of contiguous subcarriers; and a memory communicatively coupled to the processor, wherein the processor is further configured to:

select resources comprising a starting sub-channel and a set of contiguous sub-channels of the plurality of sub-channels for a transmission, each of the plurality of sub-channels comprising a set of contiguous subcarriers;

calculate a resource indicator value (MV) from the starting sub-channel and the set of contiguous sub-channels for the transmission;

polar encoding the MV to produce the encoded channel indicator;

transmit, via the wireless transceiver, the encoded channel indicator over the set of contiguous sub-channels starting from the starting sub-channel within at least one symbol of a listen-before-talk (LBT) section of a slot of the plurality of slots; and transmit, via the wireless transceiver, information corresponding to the transmission within a transmit section of the slot.

14. The V2X device of claim 13, wherein the processor is further configured to:

interleave a downlink modulation reference signal (DMRS) with information bits corresponding to the RIV.

15. The V2X device of claim 14, wherein the processor is further configured to:

polar encode the RIV interleaved with the DMRS.

16. A method for wireless communication over a vehicle-to-everything (V2X) carrier comprising spectrum that is time-divided into a plurality of slots and frequency-divided into a plurality of sub-channels, each of the plurality of sub-channels comprising a set of contiguous subcarriers, the method comprising, at a V2X device:

receiving an encoded channel indicator within at least one symbol of a listen-before-talk (LBT) section of a slot of the plurality of slots, the encoded channel indicator having been transmitted at least twice within a first symbol of the at least one symbol;

decoding the encoded channel indicator to identify a starting sub-channel and a set of contiguous sub-channels of the plurality of sub-channels for receiving a transmission over the V2X carrier; and receiving information corresponding to the transmission over the set of contiguous sub-channels starting from the starting sub-channel within a transmit section of the slot.

17. The method of claim 16, wherein receiving the information corresponding to the transmission within the transmit section of the slot further comprises:

receiving control information within a control portion of the transmit section of the slot; and receiving data within a data portion of the transmit section of the slot.

18. The method of claim 17, wherein receiving the control information within the control portion of the transmit section of the slot further comprises:

receiving the control information within a physical sidelink control channel.

19. The method of claim 17, wherein receiving the data within the data portion of the transmit section of the slot further comprises:

receiving the data within a physical sidelink shared channel.

20. The method of claim 16, wherein the encoded channel indicator comprises a polar encoded channel indicator.

21. The method of claim 16, wherein the encoded channel indicator is transmitted at least once within a first half of the first symbol, and at least once within the second half of the first symbol of the at least one symbol.

22. A method for wireless communication over a vehicle-to-everything (V2X) carrier comprising spectrum that is time-divided into a plurality of slots and frequency-divided into a plurality of sub-channels, each of the plurality of sub-channels comprising a set of contiguous subcarriers, the method comprising, at V2X device:

receiving a polar encoded channel indicator within at least one symbol of a listen-before-talk (LBT) section of a slot of the plurality of slots;

decoding the polar encoded channel indicator to identify a starting sub-channel and a set of contiguous sub-channels of the plurality of sub-channels for receiving a transmission over the V2X carrier; and receiving information corresponding to the transmission over the set of contiguous sub-channels starting from the starting sub-channel within a transmit section of the slot;

wherein the polar encoded channel indicator comprises a polar encoded resource indicator value (MV) calculated from the starting sub-channel within the resources and the set of contiguous sub-channels for the transmission.

23. The method of claim 22, wherein decoding the encoded channel indicator further comprises:

polar decoding the polar encoded channel indicator to produce an interleaved channel indicator comprising a downlink modulation reference signal (DMRS) interleaved with information bits corresponding to the RIV; and de-interleaving the DMRS and the information bits corresponding to the RIV to obtain the DMRS and the RIV.

24. A vehicle-to-everything (V2X) device, comprising:

a processor;

a wireless transceiver communicatively coupled to the processor and configured to communicate over a V2X carrier comprising spectrum that is time-divided into a plurality of slots and frequency-divided into a plurality of sub-channels, each of the plurality of sub-channels comprising a set of contiguous subcarriers; and a memory communicatively coupled to the processor, wherein the processor is configured to:

receive an encoded channel indicator within at least one symbol of a listen-before-talk (LBT) section of a slot of the plurality of slots, the encoded channel indicator having been transmitted at least twice within a first symbol of the at least one symbol;

decode the encoded channel indicator to identify a starting sub-channel and a set of contiguous sub-channels of the plurality of sub-channels for receiving a transmission over the V2X carrier; and receive information corresponding to the transmission over the set of contiguous sub-channels starting from the starting sub-channel within a transmit section of the slot.

25. The V2X device of claim 24, wherein the encoded channel indicator is transmitted at least once within a first half of the first symbol, and at least once within the second half of the first symbol of the at least one symbol.

26. A vehicle-to-everything (V2X) device, comprising:

a processor;

a wireless transceiver communicatively coupled to the processor and configured to communicate over a V2X carrier comprising spectrum that is time-divided into a plurality of slots and frequency-divided into a plurality of sub-channels, each of the plurality of sub-channels comprising a set of contiguous subcarriers; and a memory communicatively coupled to the processor, wherein the processor is configured to:

receive a polar encoded channel indicator within at least one symbol of a listen-before-talk (LBT) section of a slot of the plurality of slots;

decode the polar encoded channel indicator to identify a starting sub-channel and a set of contiguous sub-channels of the plurality of sub-channels for receiving a transmission over the V2X carrier; and receive information corresponding to the transmission over the set of contiguous sub-channels starting from the starting sub-channel within a transmit section of the slot;

wherein the polar encoded channel indicator comprises a polar encoded resource indicator value (MV) calculated from the starting sub-channel within the resources and the set of contiguous sub-channels for the transmission.

27. The V2X device of claim 26, wherein the processor is configured to:

polar decode the polar encoded channel indicator to produce an interleaved channel indicator comprising a downlink modulation reference signal (DMRS) interleaved with information bits corresponding to the MV; and de-interleave the DMRS and the information bits corresponding to the RIV to obtain the DMRS and the RIV.

* * * * *